(12) United States Patent
Hansen

(10) Patent No.: US 9,180,910 B2
(45) Date of Patent: *Nov. 10, 2015

(54) APPARATUS FOR CONVERTING A WHEELED VEHICLE TO A TRACKED VEHICLE

(71) Applicant: Vermeer Manufacturing Company, Pella, IA (US)

(72) Inventor: Ronald S. Hansen, Kindred, ND (US)

(73) Assignee: Vermeer Manufacturing Company, Pella, IA (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/666,802

(22) Filed: Nov. 1, 2012

(65) Prior Publication Data

US 2013/0113273 A1 May 9, 2013

Related U.S. Application Data

(63) Continuation of application No. 12/518,826, filed as application No. PCT/US2007/025401 on Dec. 11, 2007, now Pat. No. 8,430,188.

(60) Provisional application No. 60/874,106, filed on Dec. 11, 2006.

(51) Int. Cl.
*B62D 11/20* (2006.01)
*B62D 55/14* (2006.01)
(Continued)

(52) U.S. Cl.
CPC .............. *B62D 11/20* (2013.01); *B62D 55/04* (2013.01); *B62D 55/065* (2013.01);
(Continued)

(58) Field of Classification Search
CPC .............. B62D 55/065; B62D 55/112; B62D 55/1125; B62D 55/12; B62D 55/14; B62D 55/30
USPC .............. 180/9.1, 9.21, 9.23, 9.26, 9.28, 9.5; 305/124, 126, 129, 134, 135, 143, 145; 474/110
See application file for complete search history.

(56) References Cited

U.S. PATENT DOCUMENTS

| 112,460 A | 3/1871 | House |
|---|---|---|
| 994,317 A | 6/1911 | Holt |

(Continued)

FOREIGN PATENT DOCUMENTS

| CA | 976213 | 10/1975 |
|---|---|---|
| CA | 2 672 499 | 6/2008 |

(Continued)

OTHER PUBLICATIONS

Dana Corporation, Spicer Off-Highway Systems Drivetrain Products Catalogue, pp. 1-11 (Sep. 2005).
Ditch Witch RT115, HT115, RT95, RT75: RT/HT Tractors, Dtich Witch® Groundbreaking, www.ditchwitch.com, 12 pages, Jun. 10, 2006.
Dtich Witch RT55, RT40, RT36: RT Tractors, Dtich Witch® Groundbreaking, www.ditchwitch.com, 12 pages, Jun. 10, 2006.

(Continued)

*Primary Examiner* — Anne Marie Boehler
(74) *Attorney, Agent, or Firm* — Merchant & Gould P.C.

(57) ABSTRACT

The invention relates to track systems 14, 14' that may be used to convert steerable, all-wheel drive construction equipment to steerable, multi-track construction vehicles 10. A preferred embodiment of the track system 14, 14' includes a frame 60, 182 having a reinforcing enclosure 150, 230, a plurality of track engaging rollers 82-86, 202-206, a sprocket 102, 214, and an endless track 76, 198 operatively connected to the frame 60, 182. Tension on the endless track 76, 198 is maintained with two tensioning members 170, 244 operatively connected to the forwardmost roller 82, 202. The track system 14, 14' preferably includes a limiting apparatus 300 that is configured to restrict the rotational movement "r" of the frame 60, 182 relative to a vehicle axle 16 to which it is attached. The limiting apparatus 300 has a first component 40, which is associated with the vehicle axle 16, is configured and arranged to interact with a second component 262, which is associated with the frame of the track system 14, 14'. Preferably, the limiting apparatus 300 is adjustable such that the range of rotational movement "r" can be varied.

7 Claims, 25 Drawing Sheets

(51) Int. Cl.
*B62D 55/30* (2006.01)
*B62D 55/04* (2006.01)
*B62D 55/065* (2006.01)
*B62D 55/125* (2006.01)
*B62D 55/10* (2006.01)
*B62D 55/084* (2006.01)

(52) U.S. Cl.
CPC ............. *B62D 55/084* (2013.01); *B62D 55/10* (2013.01); *B62D 55/125* (2013.01); *B62D 55/14* (2013.01); *B62D 55/30* (2013.01); *B62D 55/305* (2013.01)

(56) References Cited

U.S. PATENT DOCUMENTS

| | | | |
|---|---|---|---|
| 1,003,110 A | 9/1911 | Holt | |
| 1,038,569 A | 9/1912 | Grover | |
| 1,112,460 A | 10/1914 | Leavitt | |
| 1,228,687 A * | 6/1917 | Miller | 305/126 |
| 1,237,970 A | 8/1917 | Strait | |
| 1,301,040 A | 4/1919 | Colahan | |
| 1,354,219 A | 9/1920 | Seltenright | |
| 1,388,637 A | 8/1921 | French | |
| 1,510,988 A | 10/1924 | French | |
| 1,636,829 A | 7/1927 | Neighbour | |
| 1,808,735 A | 6/1931 | Henneuse et al. | |
| 1,810,138 A | 6/1931 | Kincannon | |
| 1,856,068 A | 5/1932 | Christie | |
| 2,105,917 A | 1/1938 | Herrington | |
| 2,111,587 A | 3/1938 | Goldstine | |
| 2,315,421 A | 2/1941 | Heaslet | |
| 2,421,904 A | 6/1947 | Penote | |
| 2,467,947 A | 4/1949 | Skelton | |
| 2,496,136 A | 1/1950 | Smith | |
| 2,533,271 A | 12/1950 | Livermon | |
| 2,584,512 A | 2/1952 | Strait | |
| 2,598,863 A | 6/1952 | Tucker | |
| 2,618,349 A | 11/1952 | Ludema | |
| 2,676,450 A | 4/1954 | Schaaf et al. | |
| 2,719,062 A | 9/1955 | Arps | |
| 3,072,443 A | 1/1963 | Yoe | |
| 3,082,043 A * | 3/1963 | Orton | 305/145 |
| 3,082,044 A | 3/1963 | Klemm et al. | |
| 3,099,098 A | 7/1963 | Davis | |
| 3,163,249 A | 12/1964 | Ledohowski | |
| 3,173,236 A | 3/1965 | Byrd | |
| 3,190,384 A | 6/1965 | Dufresne | |
| 3,241,889 A | 3/1966 | Borisov et al. | |
| 3,304,703 A | 2/1967 | Schaaf | |
| 3,381,424 A | 5/1968 | Butler | |
| 3,412,820 A | 11/1968 | Wachholz | |
| 3,447,620 A | 6/1969 | Schoonover | |
| 3,458,214 A | 7/1969 | West | |
| 3,477,766 A * | 11/1969 | Linsay | 305/145 |
| 3,584,444 A | 6/1971 | Sammann | |
| 3,602,470 A | 8/1971 | Reynolds | |
| 3,647,270 A | 3/1972 | Althaus | |
| 3,682,266 A | 8/1972 | Stoliker | |
| 3,689,123 A | 9/1972 | Barbieri | |
| 3,719,242 A | 3/1973 | Duclo | |
| 3,733,107 A | 5/1973 | Cote et al. | |
| 3,736,032 A | 5/1973 | Mosshart et al. | |
| 3,741,331 A | 6/1973 | Kowalik | |
| 3,768,878 A | 10/1973 | Garman | |
| 3,771,241 A | 11/1973 | Lindell et al. | |
| 3,774,708 A | 11/1973 | Purcell et al. | |
| 3,787,099 A | 1/1974 | Tucker et al. | |
| 3,789,942 A | 2/1974 | Kowalik | |
| 3,826,388 A | 7/1974 | Oldenburg et al. | |
| 3,841,424 A | 10/1974 | Purcell et al. | |
| 3,857,616 A | 12/1974 | Tucker et al. | |
| 3,869,010 A | 3/1975 | Stedman | |
| 3,885,641 A | 5/1975 | Harris | |
| 3,938,606 A | 2/1976 | Yancey | |
| 4,023,624 A | 5/1977 | Frisbee | |
| 4,042,053 A | 8/1977 | Sieren et al. | |
| 4,043,417 A | 8/1977 | Orpana | |
| 4,089,565 A | 5/1978 | Loegering et al. | |
| 4,100,990 A | 7/1978 | Stedman | |
| 4,227,749 A | 10/1980 | Hesse | |
| 4,299,425 A | 11/1981 | Renz et al. | |
| 4,313,516 A | 2/1982 | Terry | |
| 4,406,501 A | 9/1983 | Christensen | |
| 4,429,516 A | 2/1984 | Erickson | |
| 4,448,273 A | 5/1984 | Barbieri | |
| 4,458,954 A | 7/1984 | Haas | |
| 4,553,790 A | 11/1985 | Boggs | |
| 4,708,218 A | 11/1987 | Mäkelä | |
| 4,712,469 A | 12/1987 | Hesse | |
| 4,722,174 A | 2/1988 | Landry et al. | |
| 4,726,631 A | 2/1988 | Jones et al. | |
| 4,817,746 A | 4/1989 | Purcell et al. | |
| 4,865,141 A | 9/1989 | Gey | |
| 4,869,354 A | 9/1989 | Brazier | |
| 4,936,639 A | 6/1990 | Pohjola | |
| 4,944,562 A | 7/1990 | Garrison | |
| 4,953,919 A | 9/1990 | Langford | |
| 5,005,920 A | 4/1991 | Kinsinger | |
| 5,018,591 A | 5/1991 | Price | |
| 5,033,214 A | 7/1991 | Kaczmarski et al. | |
| D327,692 S | 7/1992 | Kaczmarski et al. | |
| 5,165,765 A | 11/1992 | Baylor | |
| 5,203,101 A | 4/1993 | Bryan | |
| 5,237,888 A | 8/1993 | McCombs | |
| 5,240,084 A | 8/1993 | Christianson | |
| 5,246,246 A | 9/1993 | Kendall | |
| 5,273,126 A | 12/1993 | Reed et al. | |
| 5,284,387 A | 2/1994 | Loegering | |
| 5,316,381 A | 5/1994 | Isaacson et al. | |
| 5,343,960 A | 9/1994 | Gilbert | |
| 5,352,026 A | 10/1994 | Snook | |
| 5,361,860 A | 11/1994 | Smith et al. | |
| 5,368,115 A | 11/1994 | Crabb | |
| 5,388,656 A | 2/1995 | Lagasse | |
| 5,409,305 A | 4/1995 | Nagorcka | |
| 5,413,181 A | 5/1995 | Keigley | |
| 5,429,429 A | 7/1995 | Loegering et al. | |
| 5,452,949 A | 9/1995 | Kelderman | |
| D364,879 S | 12/1995 | Bastian et al. | |
| 5,509,220 A | 4/1996 | Cooper | |
| 5,515,625 A | 5/1996 | Keigley | |
| 5,566,773 A | 10/1996 | Gersmann | |
| D375,506 S | 11/1996 | Bastian et al. | |
| 5,607,210 A | 3/1997 | Brazier | |
| D378,755 S | 4/1997 | Kato et al. | |
| 5,622,234 A | 4/1997 | Nagorcka et al. | |
| 5,709,394 A | 1/1998 | Martin et al. | |
| 5,725,204 A | 3/1998 | Yoshida | |
| 5,768,811 A | 6/1998 | Cooper | |
| 5,829,848 A | 11/1998 | Kelderman | |
| 5,842,757 A | 12/1998 | Kelderman | |
| D406,151 S | 2/1999 | Cunningham et al. | |
| RE36,284 E | 8/1999 | Kelderman | |
| 5,954,148 A | 9/1999 | Okumura et al. | |
| 5,988,776 A | 11/1999 | Zurn | |
| 6,007,166 A | 12/1999 | Tucker et al. | |
| D422,606 S | 4/2000 | Katoh et al. | |
| D425,526 S | 5/2000 | Juncker et al. | |
| 6,062,327 A | 5/2000 | Ketting et al. | |
| 6,062,661 A | 5/2000 | Juncker et al. | |
| 6,062,662 A | 5/2000 | Witt | |
| 6,068,353 A | 5/2000 | Juncker et al. | |
| 6,074,024 A | 6/2000 | Juncker | |
| 6,074,025 A | 6/2000 | Juncker et al. | |
| 6,079,519 A | 6/2000 | Lottes | |
| 6,116,362 A | 9/2000 | Schubert et al. | |
| 6,129,426 A | 10/2000 | Tucker | |
| 6,176,334 B1 | 1/2001 | Lorenzen | |
| 6,176,344 B1 | 1/2001 | Lester | |
| D438,546 S | 3/2001 | Katoh et al. | |
| 6,199,646 B1 | 3/2001 | Tani et al. | |
| 6,305,762 B1 | 10/2001 | Oertley | |
| 6,318,484 B2 | 11/2001 | Lykken et al. | |

(56) References Cited

U.S. PATENT DOCUMENTS

| | | |
|---|---|---|
| 6,322,171 B1 | 11/2001 | Fornes |
| 6,401,847 B1 | 6/2002 | Lykken |
| 6,447,077 B1 | 9/2002 | Durick et al. |
| 6,536,854 B2 | 3/2003 | Juncker et al. |
| 6,543,861 B1 | 4/2003 | Kahle et al. |
| 6,543,862 B1 | 4/2003 | Kahle et al. |
| 6,547,345 B2 | 4/2003 | Phely |
| 6,557,953 B1 | 5/2003 | Kahle et al. |
| 6,640,915 B2 | 11/2003 | Haringer |
| D483,043 S | 12/2003 | Akashima et al. |
| D488,171 S | 4/2004 | Juncker et al. |
| D489,381 S | 5/2004 | Mistry et al. |
| D497,621 S | 10/2004 | Inaoka et al. |
| D499,748 S | 12/2004 | Komatsu et al. |
| 6,840,338 B2 | 1/2005 | Bowers et al. |
| D501,487 S | 2/2005 | Katoh et al. |
| 6,889,782 B2 | 5/2005 | Komatsu et al. |
| 6,904,986 B2 | 6/2005 | Brazier |
| RE38,779 E | 8/2005 | Lovitt, Jr. |
| 6,926,105 B2 | 8/2005 | Brazier |
| 6,929,334 B2 | 8/2005 | Verheye et al. |
| 6,968,914 B2 | 11/2005 | Tucker |
| D513,268 S | 12/2005 | Wang et al. |
| 6,983,812 B2 | 1/2006 | Tucker |
| D514,596 S | 2/2006 | Radke |
| D523,027 S | 6/2006 | Yamashita et al. |
| D523,874 S | 6/2006 | Hagele |
| 7,077,216 B2 | 7/2006 | Juncker |
| D525,992 S | 8/2006 | Higashikawa et al. |
| D526,335 S | 8/2006 | Kuwae et al. |
| 7,083,241 B2 | 8/2006 | Gunter |
| 7,100,715 B2 | 9/2006 | Mukaino et al. |
| D529,932 S | 10/2006 | Yamashita et al. |
| 7,156,185 B2 | 1/2007 | Juncker |
| 7,172,257 B2 | 2/2007 | Tamaru et al. |
| 7,178,446 B2 | 2/2007 | Kucher et al. |
| D540,829 S | 4/2007 | Johnson et al. |
| 7,201,242 B2 | 4/2007 | Tucker, Jr. |
| 7,222,924 B2 | 5/2007 | Christianson |
| 7,229,140 B2 | 6/2007 | Page et al. |
| 7,255,184 B2 | 8/2007 | Loegering et al. |
| D553,159 S | 10/2007 | Higashikawa et al. |
| 7,296,862 B2 | 11/2007 | Albright et al. |
| D556,789 S | 12/2007 | Kitayama et al. |
| D556,791 S | 12/2007 | Brazier |
| D558,797 S | 1/2008 | Yamamoto et al. |
| D559,277 S | 1/2008 | Tsujita et al. |
| D559,278 S | 1/2008 | Tsujita et al. |
| 7,370,918 B2 | 5/2008 | Tucker |
| D581,953 S | 12/2008 | Matsumoto et al. |
| 7,467,831 B2 | 12/2008 | Bertoni |
| D587,727 S | 3/2009 | Vos et al. |
| D593,135 S | 5/2009 | Hansen |
| D593,136 S | 5/2009 | Hansen |
| 7,552,979 B2 | 6/2009 | Christianson |
| 7,597,161 B2 | 10/2009 | Brazier |
| 7,770,984 B2 | 8/2010 | Schmit et al. |
| 7,828,396 B2 | 11/2010 | Weiser |
| 7,866,420 B1 | 1/2011 | Claas et al. |
| 7,891,743 B2 | 2/2011 | Ballard |
| 7,997,666 B2 | 8/2011 | Bordini |
| 8,240,783 B2 | 8/2012 | Johnson et al. |
| 8,827,013 B2 * | 9/2014 | Hansen ................. 180/9.21 |
| 2001/0005693 A1 | 6/2001 | Korus |
| 2002/0044500 A1 | 4/2002 | Hansen |
| 2002/0101170 A1 | 8/2002 | Dunphy et al. |
| 2002/0130552 A1 * | 9/2002 | Juncker et al. ............ 305/195 |
| 2002/0139226 A1 | 10/2002 | Hansen |
| 2002/0178622 A1 | 12/2002 | Loegering et al. |
| 2003/0011537 A1 | 1/2003 | Dunphy et al. |
| 2003/0015909 A1 | 1/2003 | Meek, Jr. |
| 2003/0058196 A1 | 3/2003 | Hansen et al. |
| 2003/0201954 A1 | 10/2003 | Hansen et al. |
| 2004/0045747 A1 | 3/2004 | Albright et al. |
| 2004/0108976 A1 | 6/2004 | Hansen |
| 2004/0119336 A1 | 6/2004 | Lussier |
| 2004/0140138 A1 | 7/2004 | Brazier |
| 2005/0035650 A1 | 2/2005 | Toews |
| 2005/0061557 A1 | 3/2005 | Brazier |
| 2005/0126328 A1 | 6/2005 | Piotrowski et al. |
| 2005/0145422 A1 | 7/2005 | Loegering et al. |
| 2005/0252698 A1 | 11/2005 | Brazier |
| 2005/0274235 A1 | 12/2005 | Hansen |
| 2006/0113121 A1 | 6/2006 | Radke et al. |
| 2006/0114188 A1 | 6/2006 | Hansen et al. |
| 2006/0118662 A1 | 6/2006 | Korus |
| 2006/0138739 A1 | 6/2006 | Rasset et al. |
| 2006/0237564 A1 | 10/2006 | Korus |
| 2006/0289676 A1 | 12/2006 | Korus |
| 2007/0017313 A1 | 1/2007 | Pattok et al. |
| 2007/0068051 A1 | 3/2007 | Mills et al. |
| 2007/0068320 A1 | 3/2007 | Hastings |
| 2007/0176030 A1 | 8/2007 | Korus |
| 2008/0054105 A1 | 3/2008 | Korus |
| 2009/0087260 A1 | 4/2009 | Korus et al. |
| 2009/0302676 A1 | 12/2009 | Brazier |
| 2009/0308669 A1 | 12/2009 | Vos et al. |
| 2010/0060075 A1 | 3/2010 | Hansen |
| 2010/0139994 A1 | 6/2010 | Hansen |
| 2010/0194188 A1 | 8/2010 | Johnson et al. |
| 2010/0295870 A1 | 11/2010 | Baghdadi et al. |
| 2011/0028561 A1 | 2/2011 | Akula et al. |
| 2011/0101135 A1 | 5/2011 | Korus et al. |
| 2011/0127344 A1 | 6/2011 | Korus et al. |
| 2011/0168305 A1 | 7/2011 | Blau et al. |
| 2012/0032971 A1 | 2/2012 | Hansen et al. |
| 2012/0067441 A1 | 3/2012 | Korus et al. |
| 2012/0080545 A1 | 4/2012 | Korus |
| 2012/0096972 A1 | 4/2012 | Retsch |
| 2012/0161511 A1 | 6/2012 | Brazier |

FOREIGN PATENT DOCUMENTS

| | | | |
|---|---|---|---|
| CA | 2 687 999 | | 6/2010 |
| CA | 2 498 222 | | 1/2012 |
| DE | 29 49 942 | A1 | 6/1981 |
| GB | 605814 | | 7/1948 |
| GB | 764868 | | 1/1957 |
| GB | 818976 | | 8/1959 |
| JP | 55-39837 | | 3/1980 |
| JP | 63-17187 | | 1/1988 |
| JP | 4-8682 | | 1/1992 |
| JP | 04133883 | * | 5/1992 |
| JP | 7-144668 | | 6/1995 |
| JP | 10-218046 | | 8/1998 |
| JP | 11-139358 | | 5/1999 |
| JP | 2000-351388 | | 12/2000 |
| JP | 3509729 | B2 | 3/2004 |
| JP | 3659851 | B2 | 6/2005 |
| SE | 189 170 | | 4/1958 |
| SU | 1263573 | A2 | 10/1986 |
| WO | WO 2005/113322 | A1 | 12/2005 |
| WO | WO 2007/101632 | A1 | 9/2007 |
| WO | WO 2008/073456 | A2 | 6/2008 |
| WO | WO 2009/033052 | A1 | 3/2009 |

OTHER PUBLICATIONS

Ditch Witch RT55 Trencher, http://web.archive.org/web/20070607131909/www.ditchwitch.com/dwcom/Equipment/Pr . . . , Copyright 2001, 4 pages.

Ditch Witch RT75 Trencher, http://web.archive.org/web/20070607112128/www.ditchwitch.com/dwcom/Equipment/Pr . . . , Copyright 2001, 5 pages.

Photographs of a Trencher (circa: 2000).

RT 1160 Ride-On Trencher, © 2007.

RT 1250 Hydrostatic Trencher/Plow, 2005.

Vermeer® RT1250 Tractor Parts Manual, Serial No. 101—Order No. 105400ZFH, Nov. 2005, 298 pages.

Search Report mailed Oct. 2, 2008 relating to International Application No. PCT/US2007/025401, 4 pages.

* cited by examiner

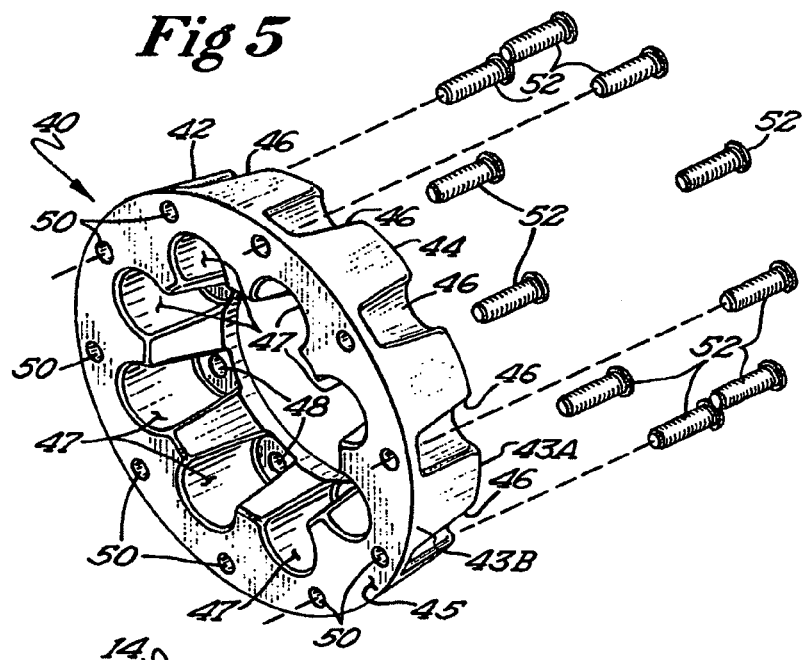
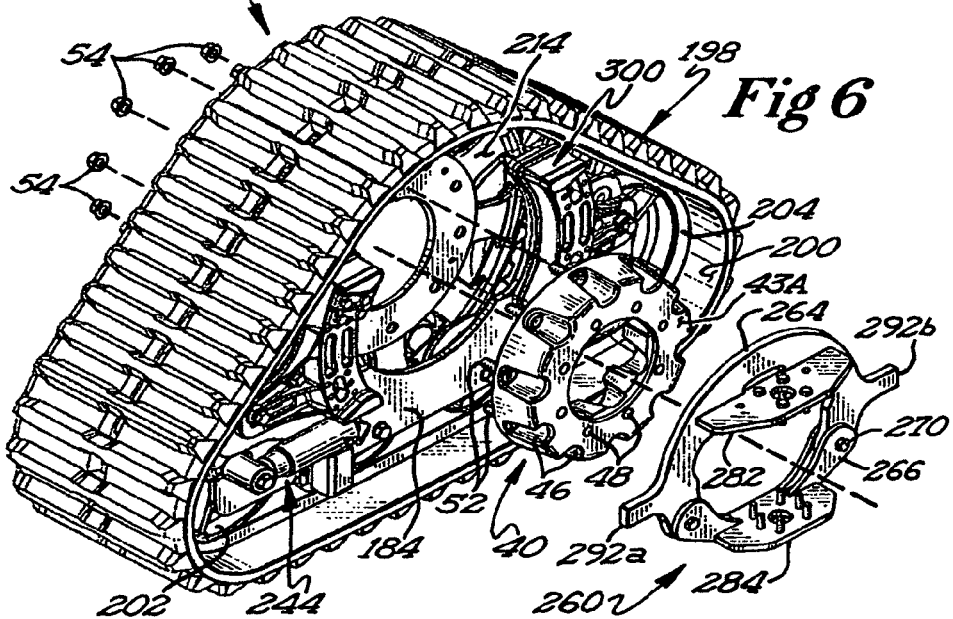

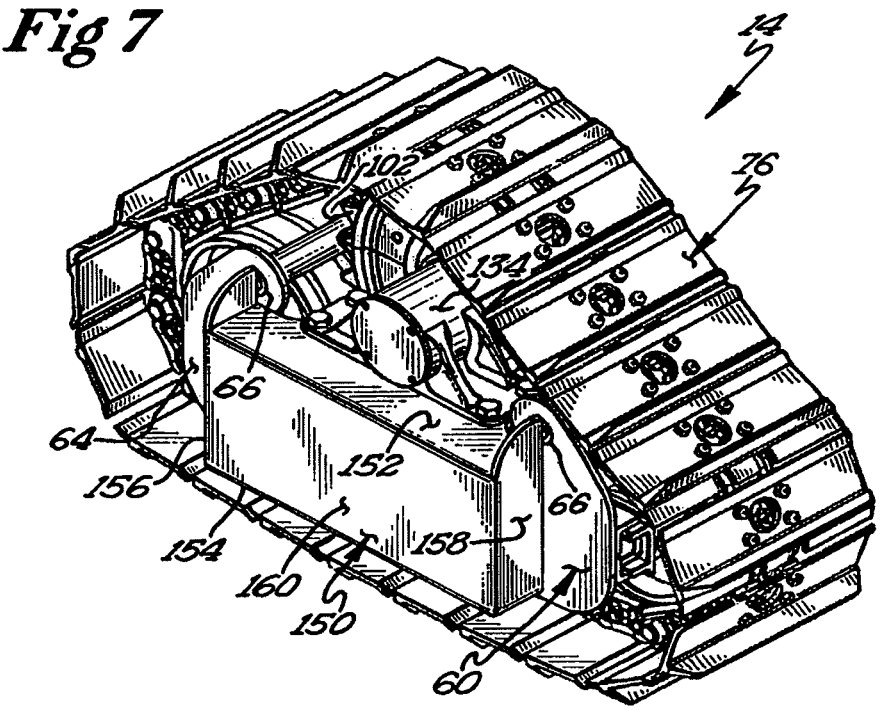

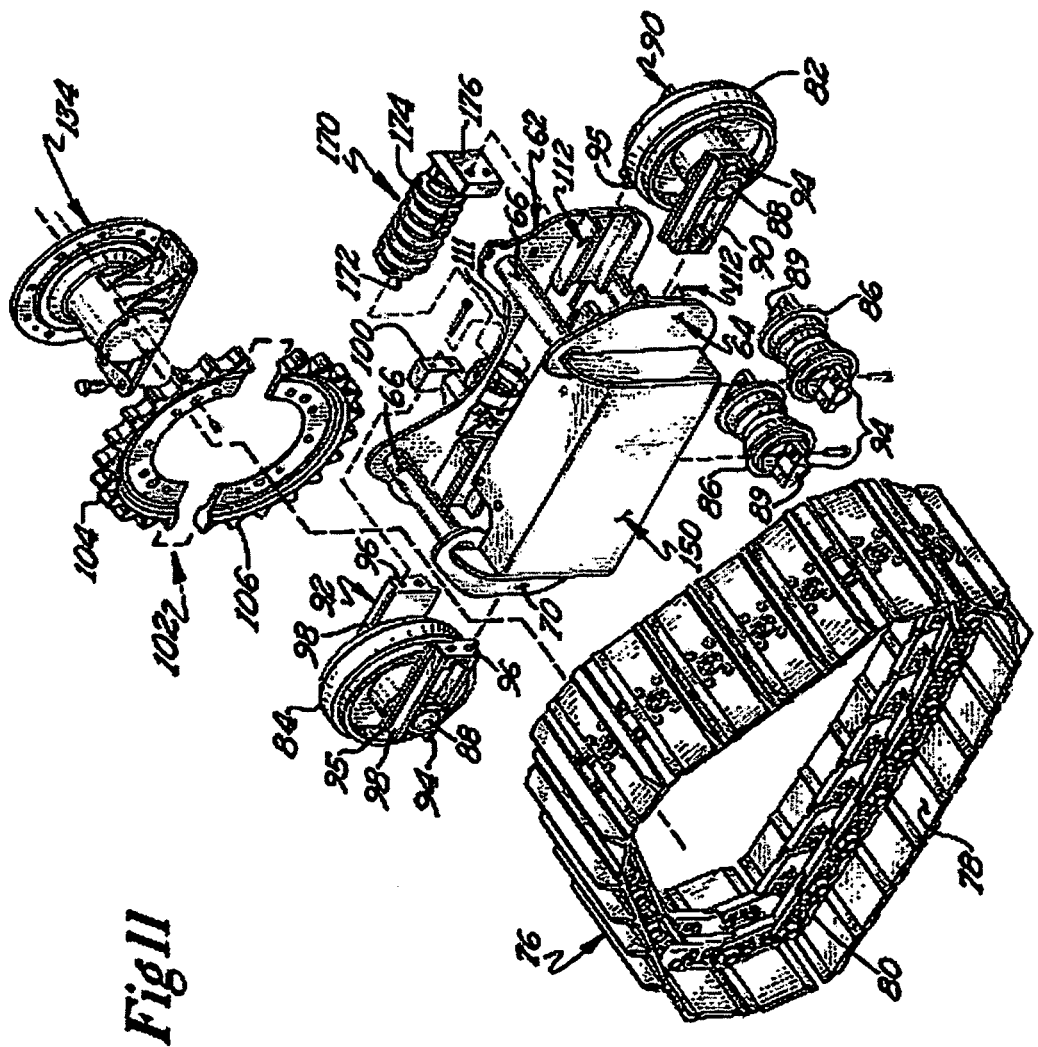

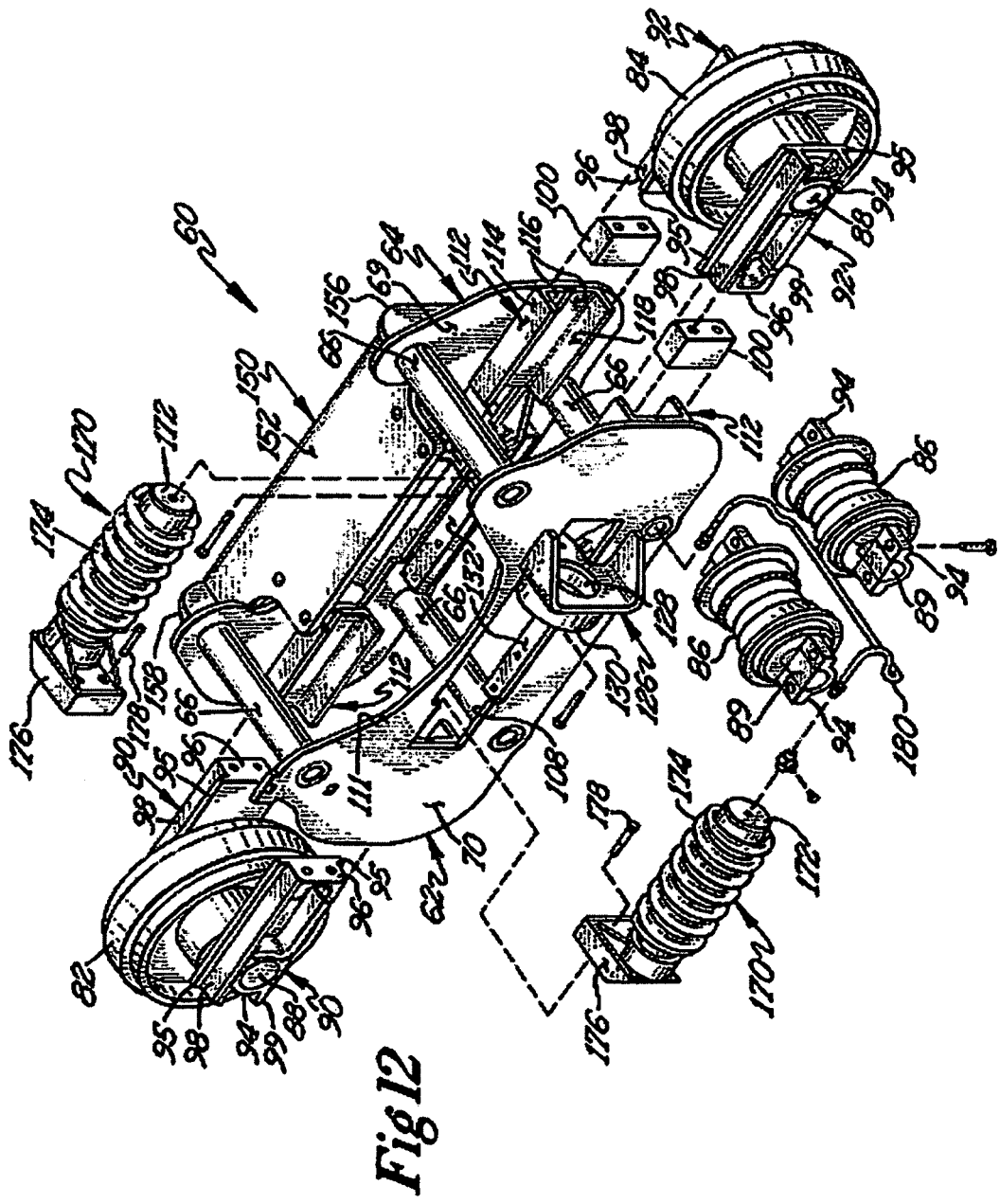

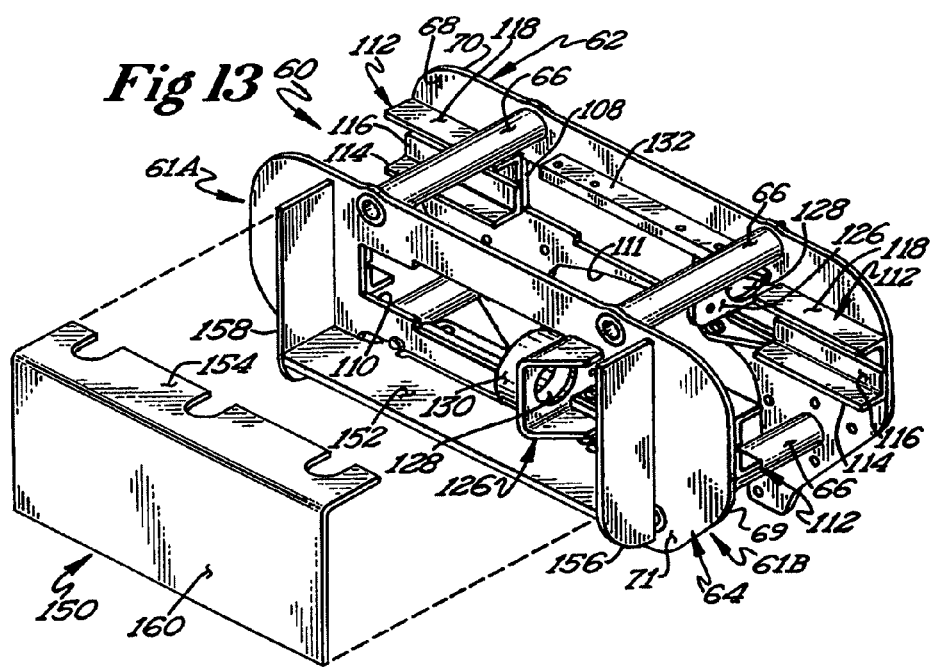

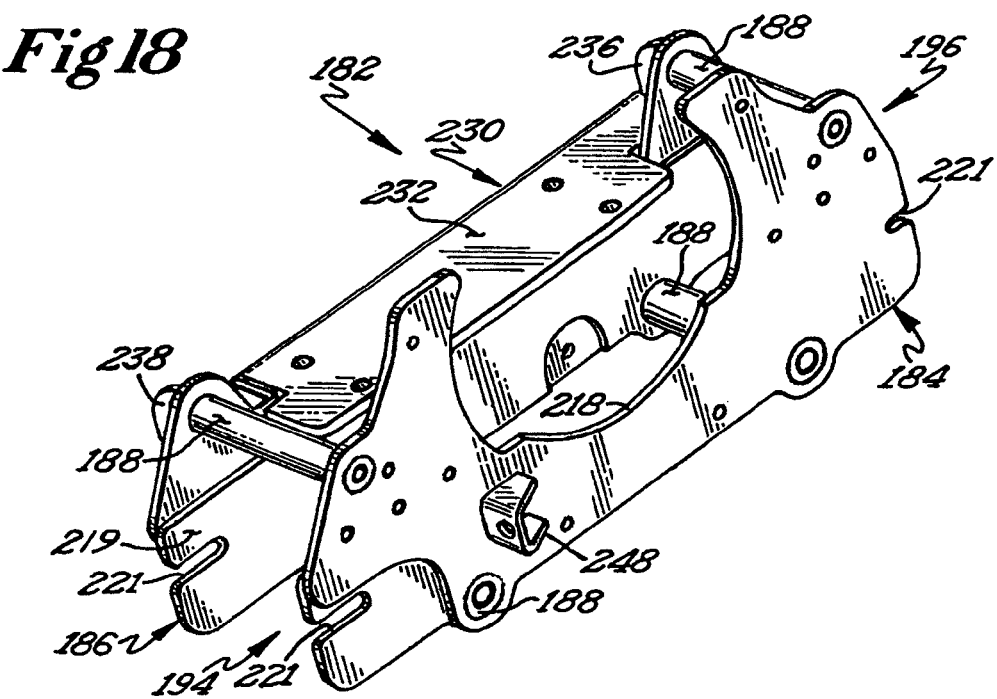
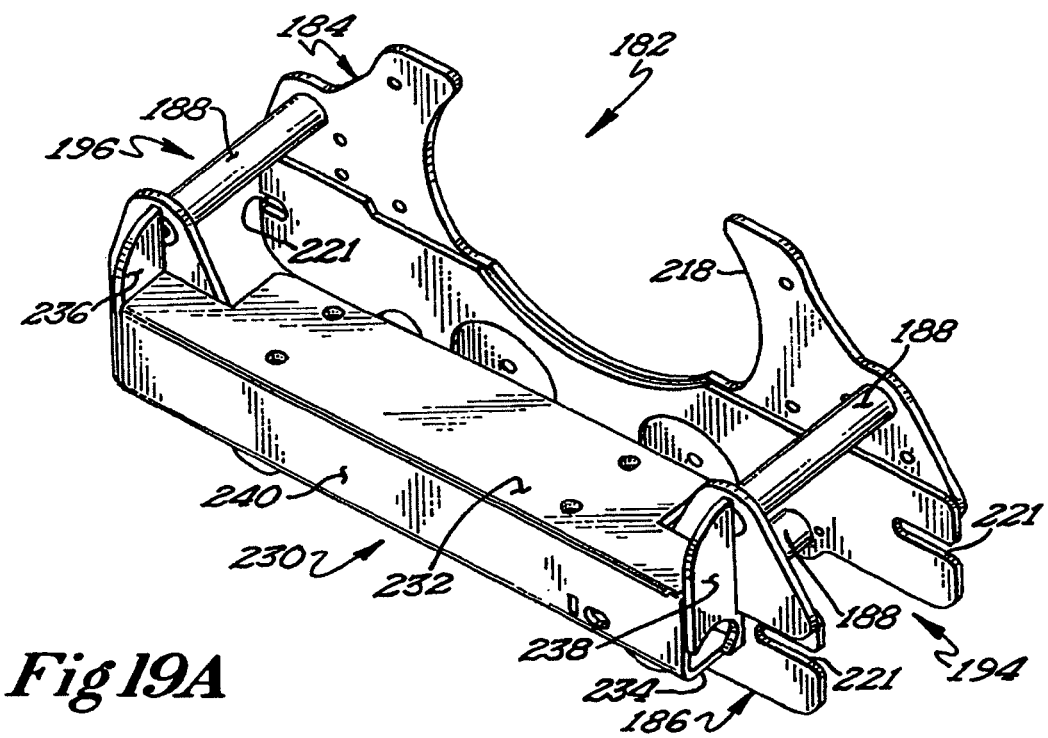

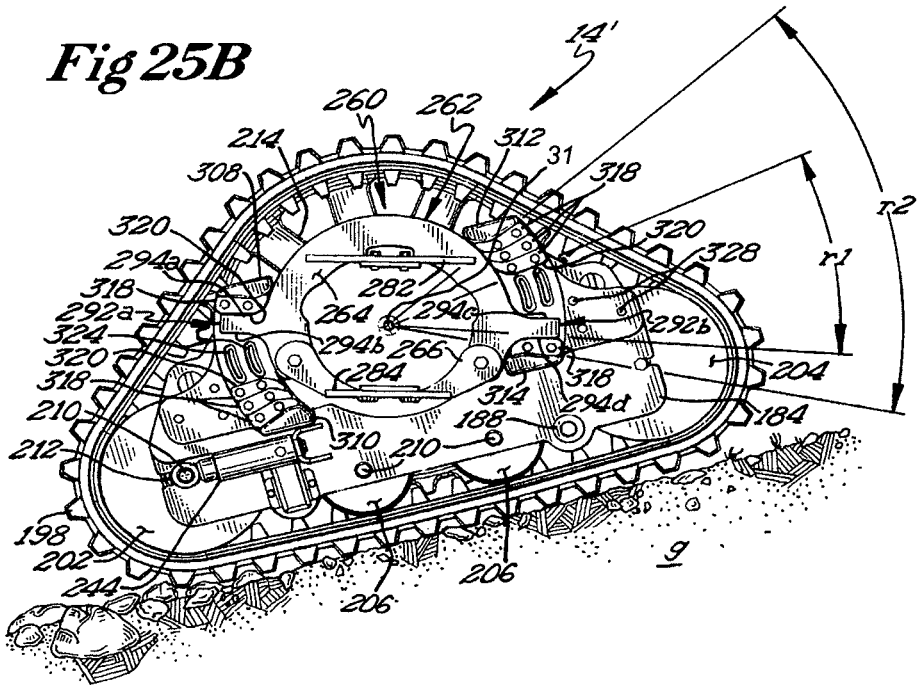
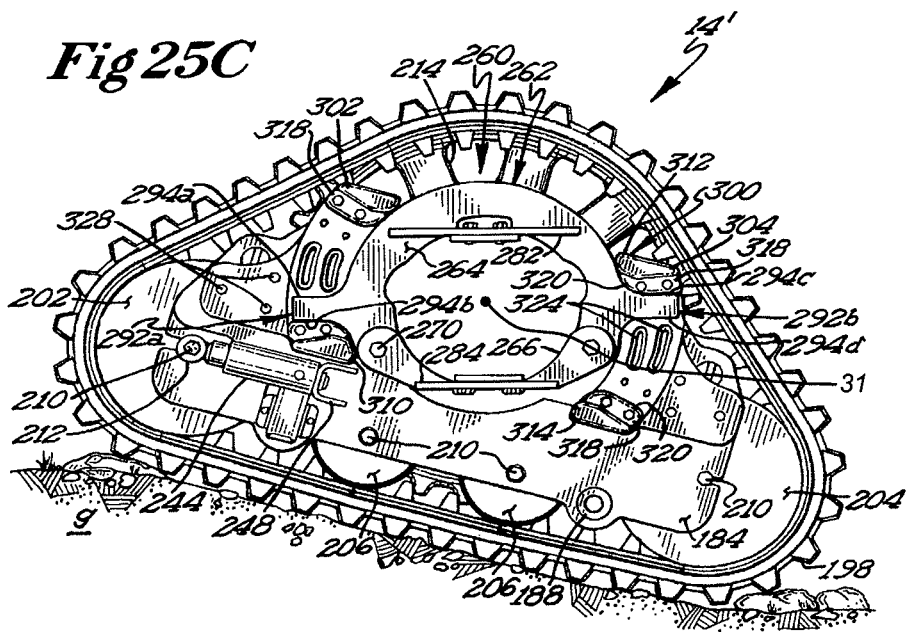

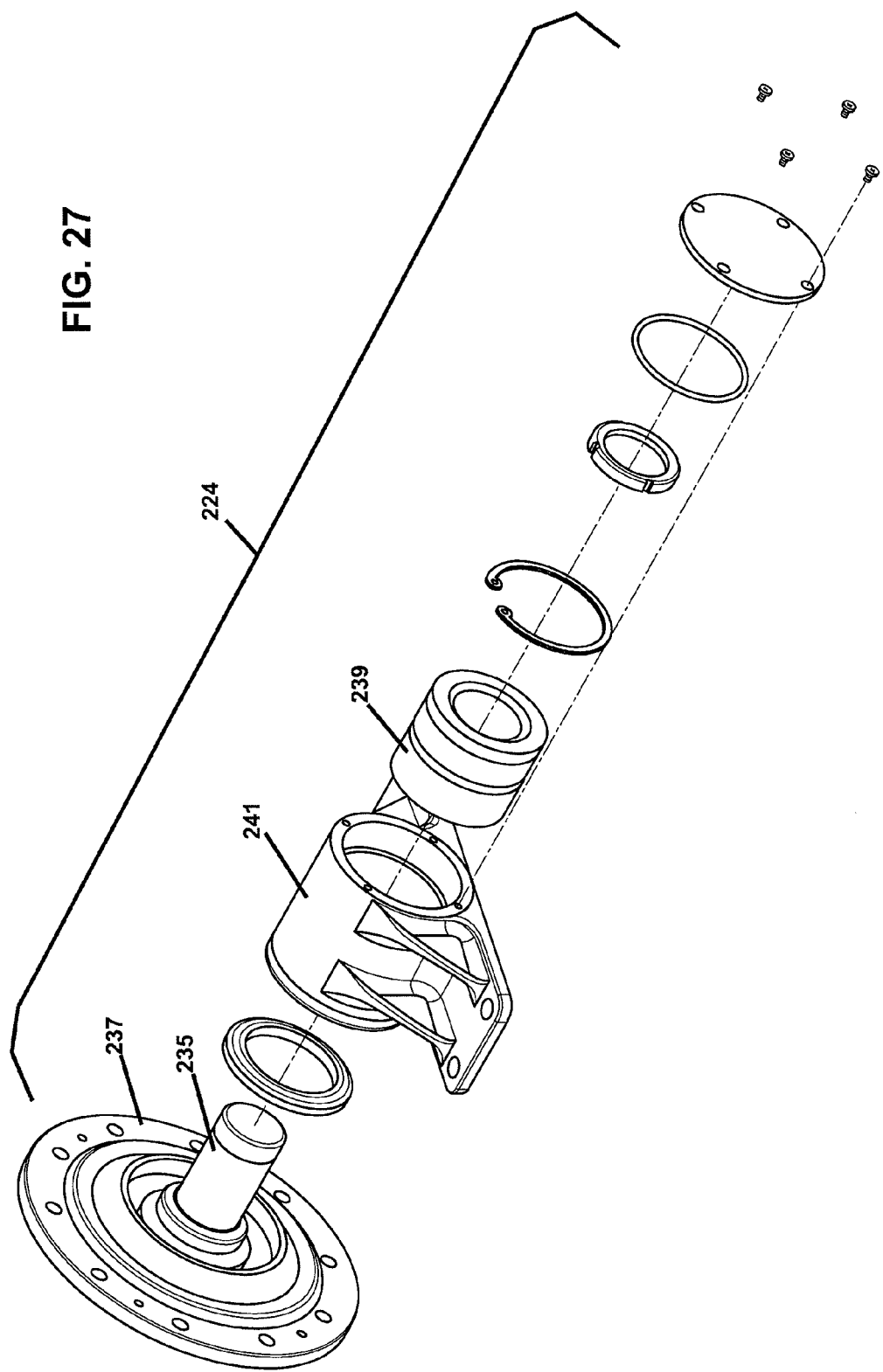

APPARATUS FOR CONVERTING A WHEELED VEHICLE TO A TRACKED VEHICLE

CROSS-REFERENCE TO RELATED APPLICATIONS

The present application is a continuation of U.S. patent application Ser. No. 12/518,826, filed Jul. 6, 2009, which is a national stage filing of PCT/US2007/025401, filed Dec. 11, 2007, which claims the benefit of U.S. Provisional Patent Application Ser. No. 60/874,106, filed Dec. 11, 2006, which applications are hereby incorporated by reference in their entireties.

FIELD OF THE INVENTION

The present invention relates to an apparatus for converting a wheeled vehicle to a tracked vehicle. More specifically, the present invention relates to track systems that may be used to convert steerable, all-wheel drive construction equipment to steerable, multi-track construction vehicles.

BACKGROUND OF THE INVENTION

Steerable, all-wheel drive construction equipment are old and well known to the art. Originally designed to operate with only a loading scoop or a bucket, these machines have, with the provision of specifically designed attachments, evolved into multi-purpose machines capable of many diverse operations. Nowadays, a steerable, all-wheel drive machine may be configured to operate as a trencher, street sweeper, a posthole digger, a forklift, a trencher, or a boom lift, for example. Trenchers are used to dig channels, typically for laying pipes or cable, or for drainage. Depending on the type of digging implement, a trencher may be classified as a chain trencher, a rockwheel trencher, or a plow. A chain trencher excavates the ground with a specialized, closed loop chain that digs into and removes earth, and which is driven around a rounded metal frame or boom, similar to a chainsaw. This type of trencher can be used to excavate in situations where it is difficult, slow, or impractical to be with traditional backhoe type excavators. In operation, the angle of the boom can be adjusted to control the depth of the cut. To excavate a trench, the boom is held at a fixed angle while the machine slowly traverses forward. A rockwheel trencher is a large diameter disc that is provided with teeth about its circumference, and is similar to a circular saw. Rockwheel trenchers can excavate harder ground than a chain trencher, and is particularly useful in situations where the_trench traverses solid stone. On a smaller scale, rockwheel trenchers can also be used to make incisions into pavement for road maintenance and/or to gain access to utilities under roads.

The cable plow is specialized form of plow that is configured to pass through the earth with a minimum of above-surface disruption. The typical cable plow is an elongated blade that has a small cross-sectional area. These types of plows are useful in situations where the ground is comparatively soft. In situations where the ground is sticky or hard, the plow may be vibrated so as to ease its passage as it moves along. The bottom or lower portion of the blade plow can be attached to a cable so that the cable will be pulled along with the blade as it traverses the ground, or laid down in the trench as the plow advances.

As will be understood, such vehicles are best utilized on solid, horizontal surfaces. The present invention provides a solution to these needs and other problems, and offers other advantages over the prior art.

SUMMARY OF THE INVENTION

Generally, the present invention is an apparatus and method for converting a wheeled vehicle to a tracked vehicle. The apparatus for converting a wheeled vehicle to a tracked vehicle includes a track system that is configured and arranged to be attached to existing wheel hubs of a vehicle such as construction equipment, preferably trenchers and boom lifts. A preferred embodiment of the track system includes a frame that includes a first plate and a second plate that are parallel to each other and which are connected to each other by a plurality of struts. The frame has a first end having a first or forewardmost roller at the first end and a second end having a second or rearwardmost roller. The forwardmost roller is preferably operatively connected to the frame such that it may be temporarily displaced relative to the second roller of the frame when the track system is in operation. The track system also includes a track engaging sprocket that is connected to the frame, and which is configured to be driven by the wheel hub to which it is attached. The preferred frame further includes a box-like enclosure that is secured to the exterior surface of the first plate. The enclosure directly increases the strength and rigidity of the first plate and indirectly increases the strength and rigidity of the second plate by way of the struts. The enclosure also reduces torsional flexing of the frame when the frame is subjected to unbalanced loading. In another embodiment of the present invention, particularly preferable for a track system having a track made of rubber or the like, the frame may be further strengthened by affixing an additional plate to one or more surfaces of the first or second plates.

In one embodiment, the frame of the present invention includes an aperture in each of the parallel plates to accommodate a respective tensioning mechanism. Each tensioning mechanism has two ends, with one operatively connected to a side or end of the shaft of one of the rollers (preferably the forwardmost roller) and with the other end operatively connected to the frame. Each tensioning mechanism includes an expandable and retractable force exerting member such as a grease cylinder, hydraulic cylinder or the like. The grease cylinders are interconnected to each other by a conduit that equalizes the pressure therebetween and the ends of the shaft to which they are connected. Each tensioning mechanism can also include a restoring element, such as a spring, which can operate in concert with the force exerting member while in operation. In use, each force exerting member urges an end of the forwardmost roller outwardly relative to the second roller of the frame to increase the tension on the endless track. This positions the first roller in a forward position where, by virtue of the tensioning mechanism, it is able to absorb impacts when the tracked vehicle encounters an object on the ground while in operation. For example, when the forwardmost roller bumps into an immovable object in the tracked vehicle's path, the first roller will tend to be pushed rearwardly towards the second roller and each of the two the force exerting members will be momentarily compressed. In the absence of the immovable object, the force exerting members will both urge the first roller back to its forward operating position. The provision of a restoring element, which serves to assist in the operation of each force exerting member, enables the tensioning mechanism to operate as if it were much larger and permits the tensioning mechanism to be formed compactly.

The track system of the present invention also preferably includes a limiting apparatus that is configured to restrict the rotational movement of the frame relative to the axle to which it is attached. Generally, the limiting apparatus includes two operative components. More specifically, the limiting apparatus includes a first component that is associated with the axle of the vehicle, and a second component that is associated with the frame of the track system, with the first and second components configured and arranged to engage each other at predetermined locations as they move relative to each other. More preferably, the track system includes a limiting apparatus that is adjustable such that the extents to which the frame can rotate with respect to the axle (i.e., the range or degrees of rotational motion relative to the vehicle to which it is attached), can be varied from around 0 degrees to 25 degrees plus or minus; more, if desired. The first component of a preferred limiting apparatus includes a collar having first and second sections connected to each other with fastening elements. The collar includes at least one stop and at least one bracket, with the stop configured and arranged to cooperate with the second component of the limiting apparatus, and with the bracket configured and arranged to attach the first component of the limiting apparatus to a vehicle axle, preferably with a plurality of fastening elements.

The second component of the preferred limiting apparatus includes a limiting assembly that may be secured to the frame of the track system. The limiting assembly preferably comprises first and second members that include either shims, posts or a combination thereof configured and arranged to define the range of rotational motion available to the frame relative to the vehicle axle. As the frame rotates, the shims or posts will eventually contact the stops of the collar such that the stops prevent the frame from moving therepast. Thus, the limiting apparatus prevents the frame from rotating beyond predetermined clockwise and counterclockwise angles of rotation with respect to the vehicle axle. The limiting apparatus can become adjustable with the addition/removal of shims or, alternatively, repositioning the posts on the first and second members.

An object of the present invention is to provide a track assembly that can be used to convert a wheeled vehicle into a tracked vehicle.

Another object of the present invention is to provide a frame for a track assembly that is able to resist torsional forces.

Another object of the present invention is to provide an apparatus for limiting the rotational movement of a track assembly relative to the vehicle to which it is attached.

Yet another object of the present invention is to provide a track assembly with a dual force, track tensioning mechanism.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 5 is a perspective view of a preferred embodiment of the spacing element of FIGS. 3-4;

FIG. 6 is an exploded, perspective, inboard view of an embodiment of the invention;

FIG. 7 is a perspective, outboard view of an embodiment of a track assembly;

FIG. 8 is a perspective, inboard view of the track assembly of FIG. 7;

FIG. 11 is an exploded view of the track assembly of FIG. 7;

FIG. 12 is an exploded, rotated, perspective view of the frame, the tensioning assemblies and support rollers of the track assembly of FIG. 11;

FIG. 13 is a perspective, inverted, partially exploded outboard view of the frame of the track assembly of FIG. 12;

FIG. 14A is a perspective inboard view of the frame of FIG. 13;

FIG. 18 is an elevated perspective view of the inboard side of the frame of the track system of FIG. 15;

FIG. 19A is an elevated perspective view of the outboard side of the frame of the track system of FIG. 15;

FIG. 25B is an inboard, elevational plan view of the track assembly of FIG. 25A in which the limiter assembly prevents the track assembly from rotating beyond a predetermined counterclockwise angle;

FIG. 25C is an inboard, elevational plan view of the track assembly of FIG. 25A in which the limiter assembly prevents the track assembly from rotating beyond a predetermined clockwise angle;

FIG. 27 is an exploded view of the track hub of the track system of FIG. 15.

DETAILED DESCRIPTION

Figure 1:
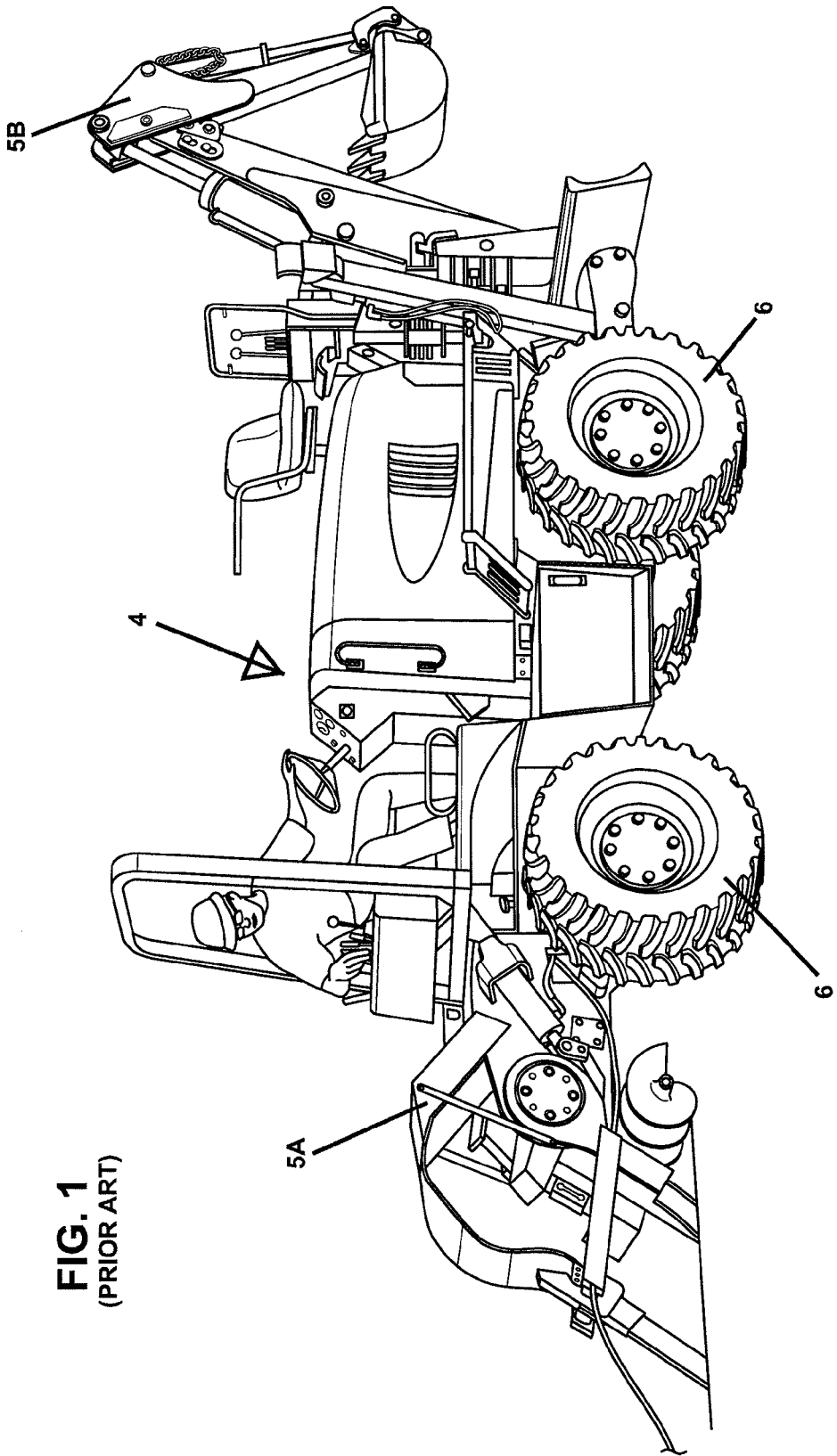
FIG. 1 is a depiction of a known, wheeled construction vehicle.
Figure 2:
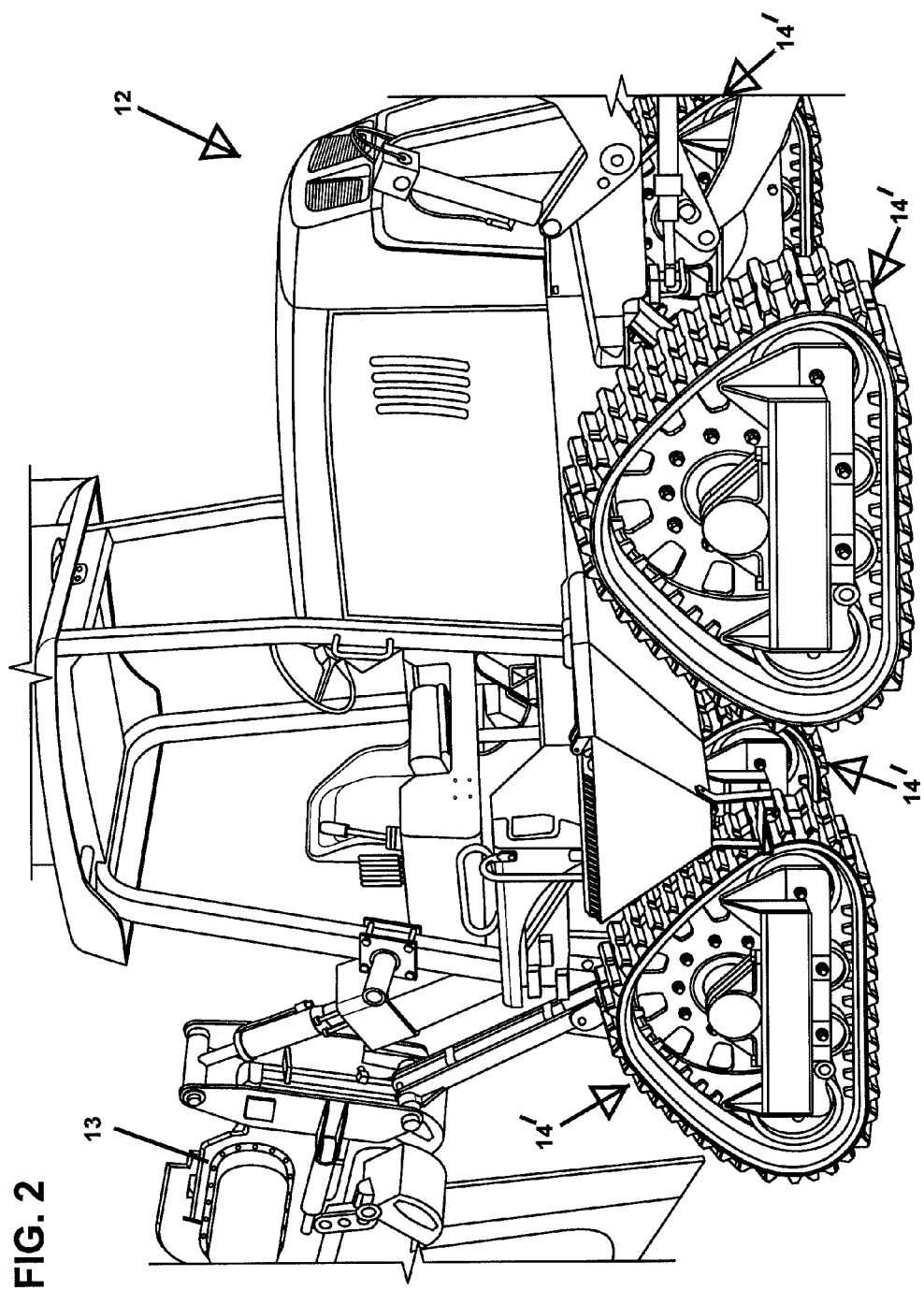
FIG. 2 is a depiction of a converted, tracked vehicle of the present invention.

FIG. 1 illustrates a generic all-wheel drive vehicle 4 having a rear-mounted trenching apparatus 5A, a front-mounted backhoe 5B and a plurality of wheels 6, connected to wheel hubs at the ends of drive axles (not shown). The wheeled vehicle 4 of FIG. 1 and vehicles having similar all-wheel drive capabilities, can be converted to a tracked vehicle using track systems and methods of the present invention. FIG. 2 illustrates a vehicle 12 similar to the vehicle 4 of FIG. 1. The vehicle 12, which includes a rear-mounted trenching apparatus 13 (depicted as a cable plow) and was originally equipped with a plurality of drive wheels that have been removed and subsequently replaced by a plurality of track systems 14' of the present invention. The present invention is useful for vehicles that are designed to be able to be used on improved road beds as well as unimproved, off-road surfaces, and is particularly useful for converting wheeled vehicles such as tractors, agricultural equipment and specialized construction equipment such as trenchers.

Figure 3:
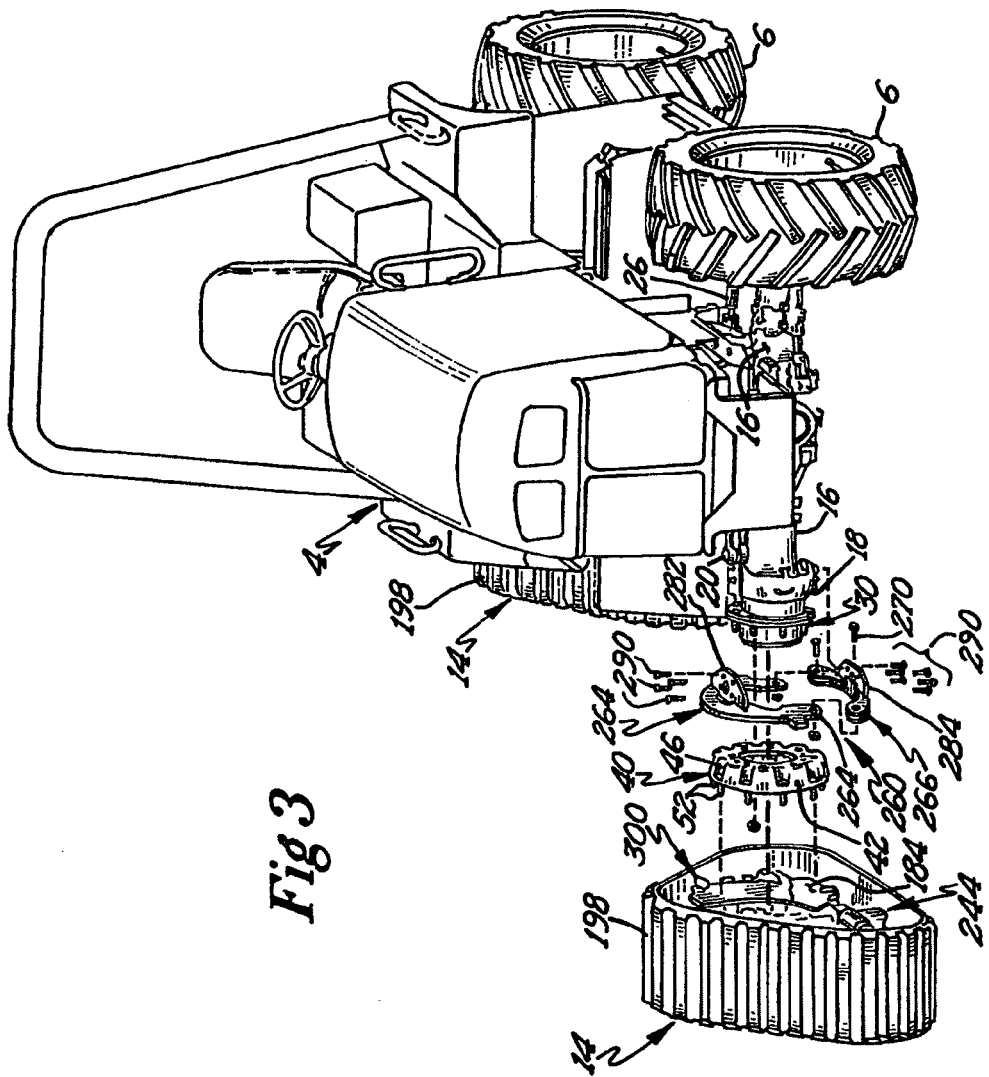
FIG. 3 is a partially exploded view showing a track system, a wheel hub of a vehicle, and a spacing element interposed between the track system and the wheel hub.
Figure 4:
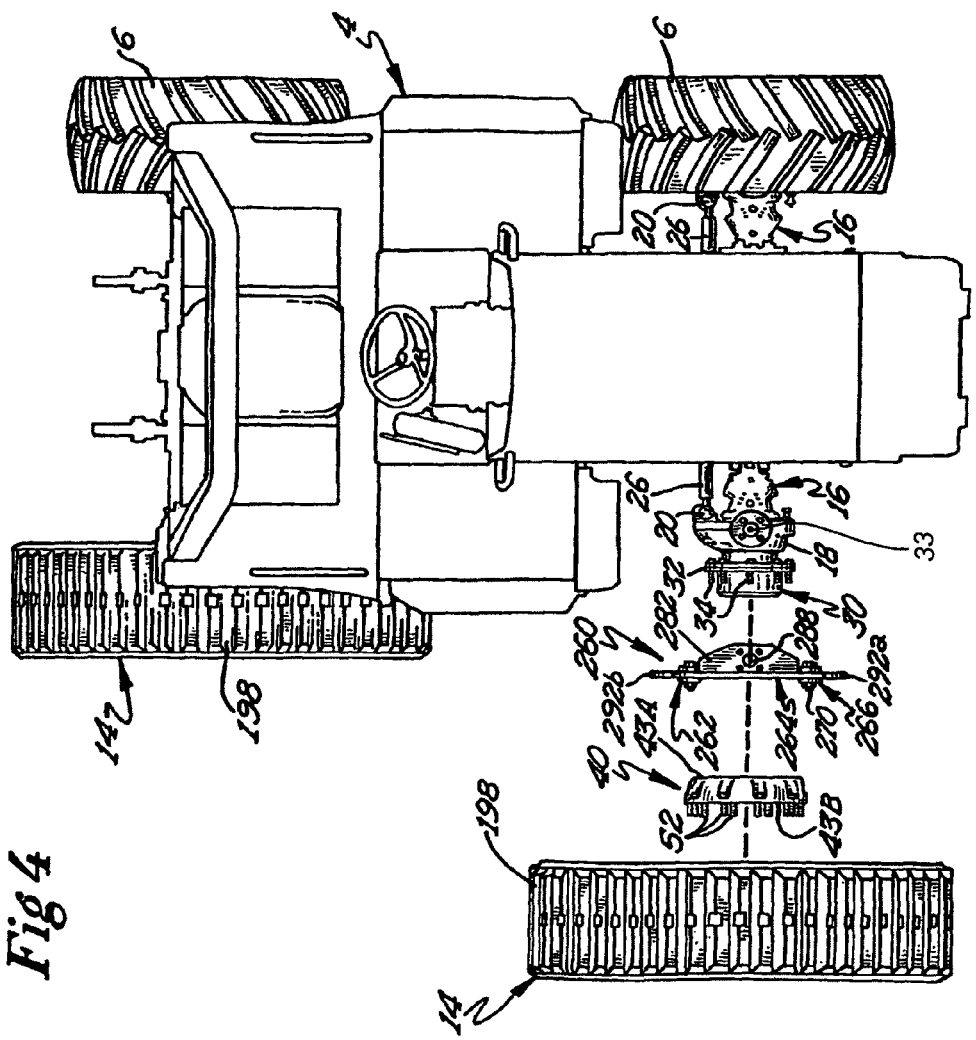
FIG. 4 is a top plan view of the track system, vehicle, and spacing element FIG. 3, with the endless track of the track system removed for clarity.
Figure 9:
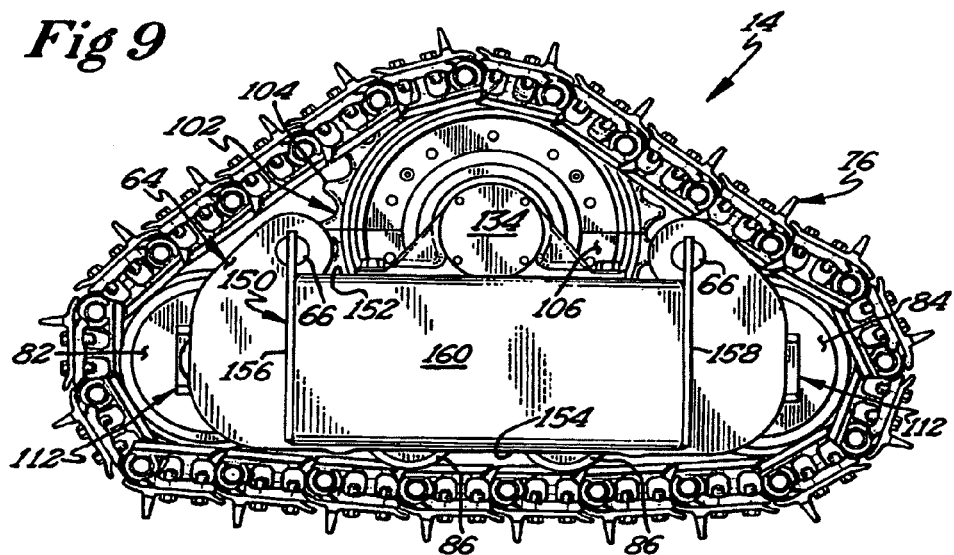
FIG. 9 is an elevational plan view of the track assembly of FIG. 7.
Figure 10:
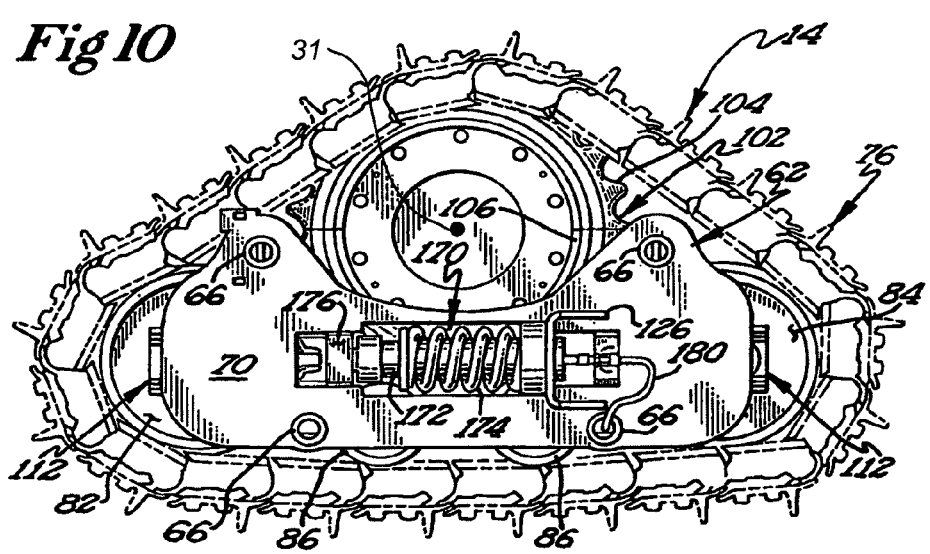
FIG. 10 is an elevational plan view of the track assembly of FIG. 8.
Figure 14B:
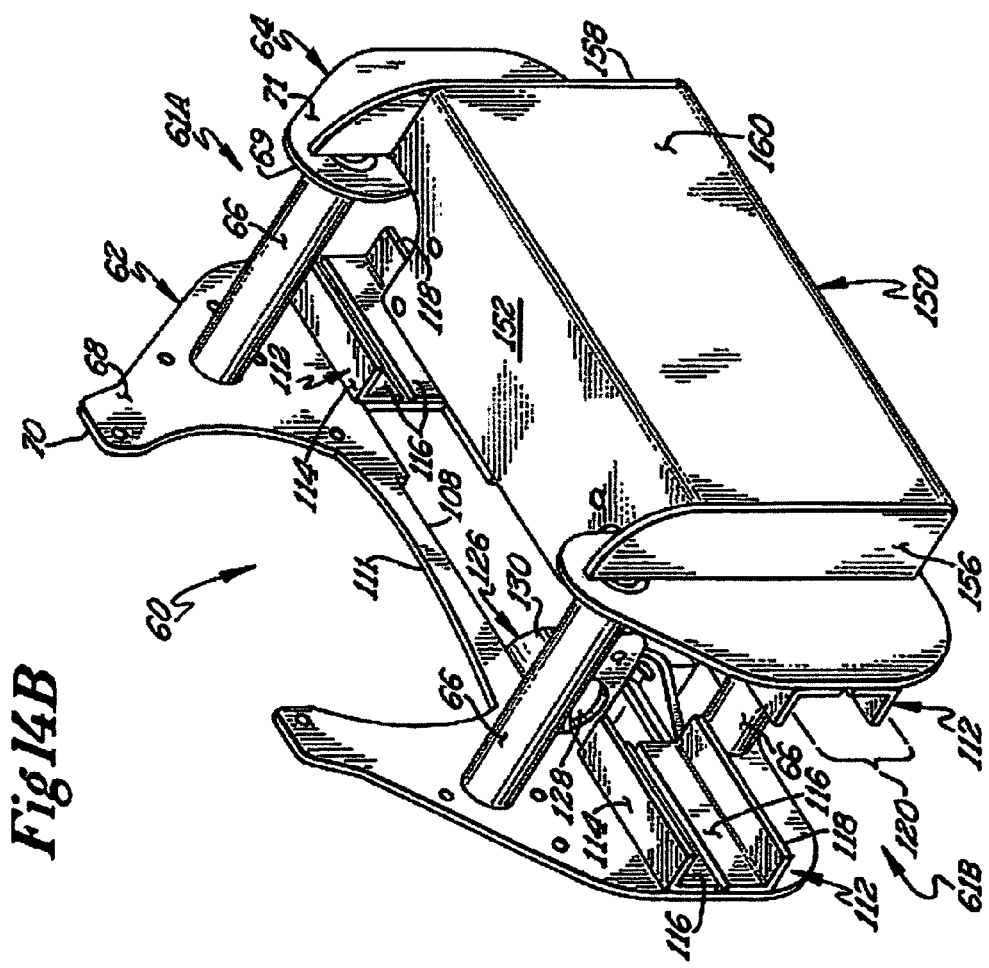
FIG. 14B is a perspective outboard view of the frame of FIG. 13.
Figure 15:
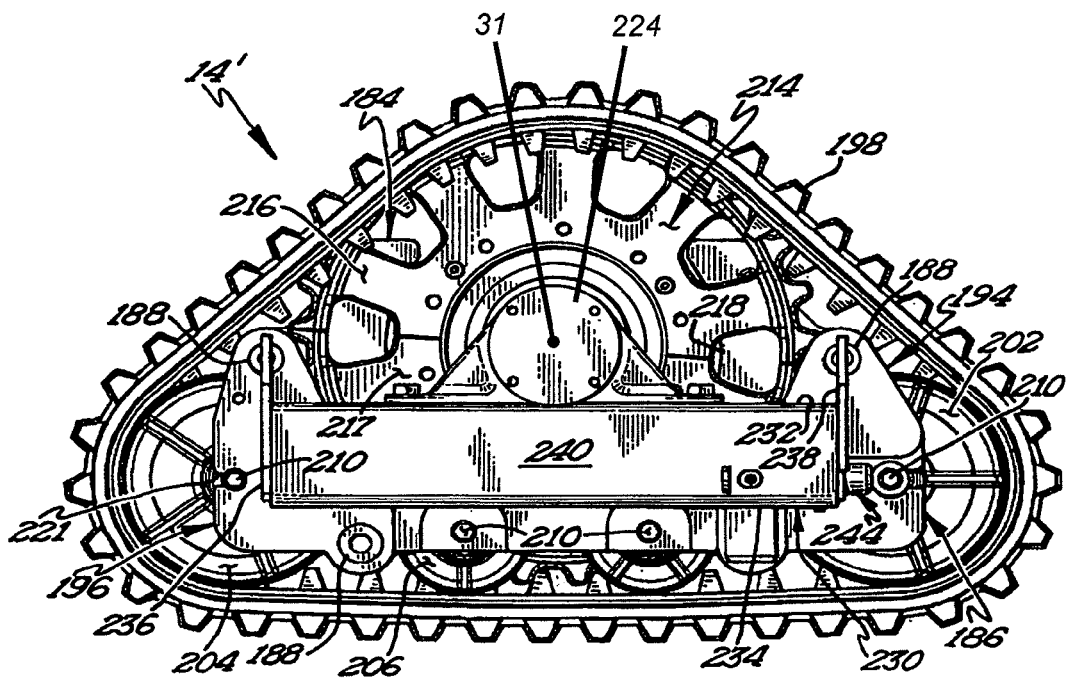
FIG. 15 is an outboard, elevational plan view of another track system of the present invention.
Figure 16A:
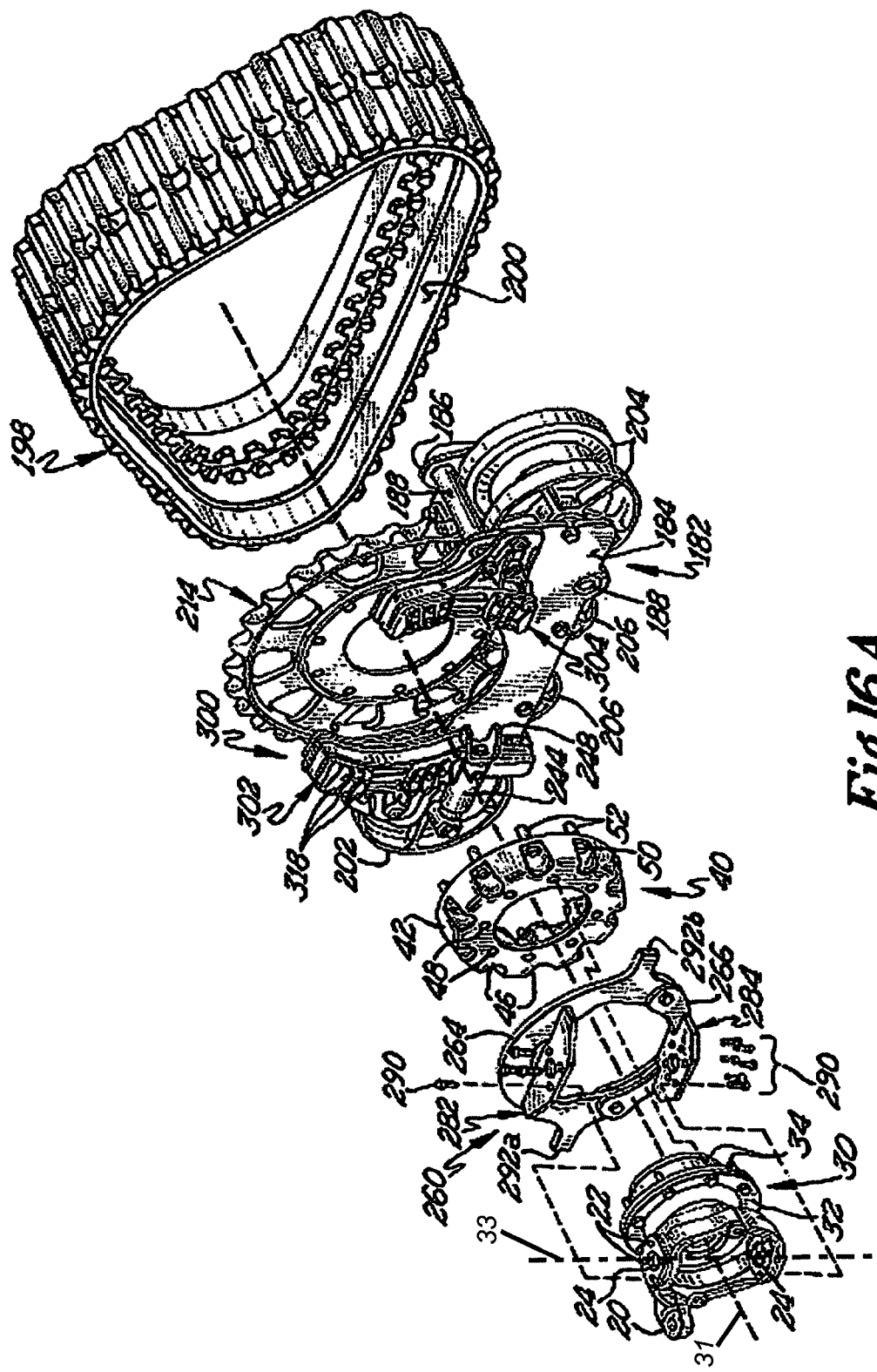
FIG. 16A is an exploded, perspective, inboard view of the track system of FIG. 15.
Figure 16B:
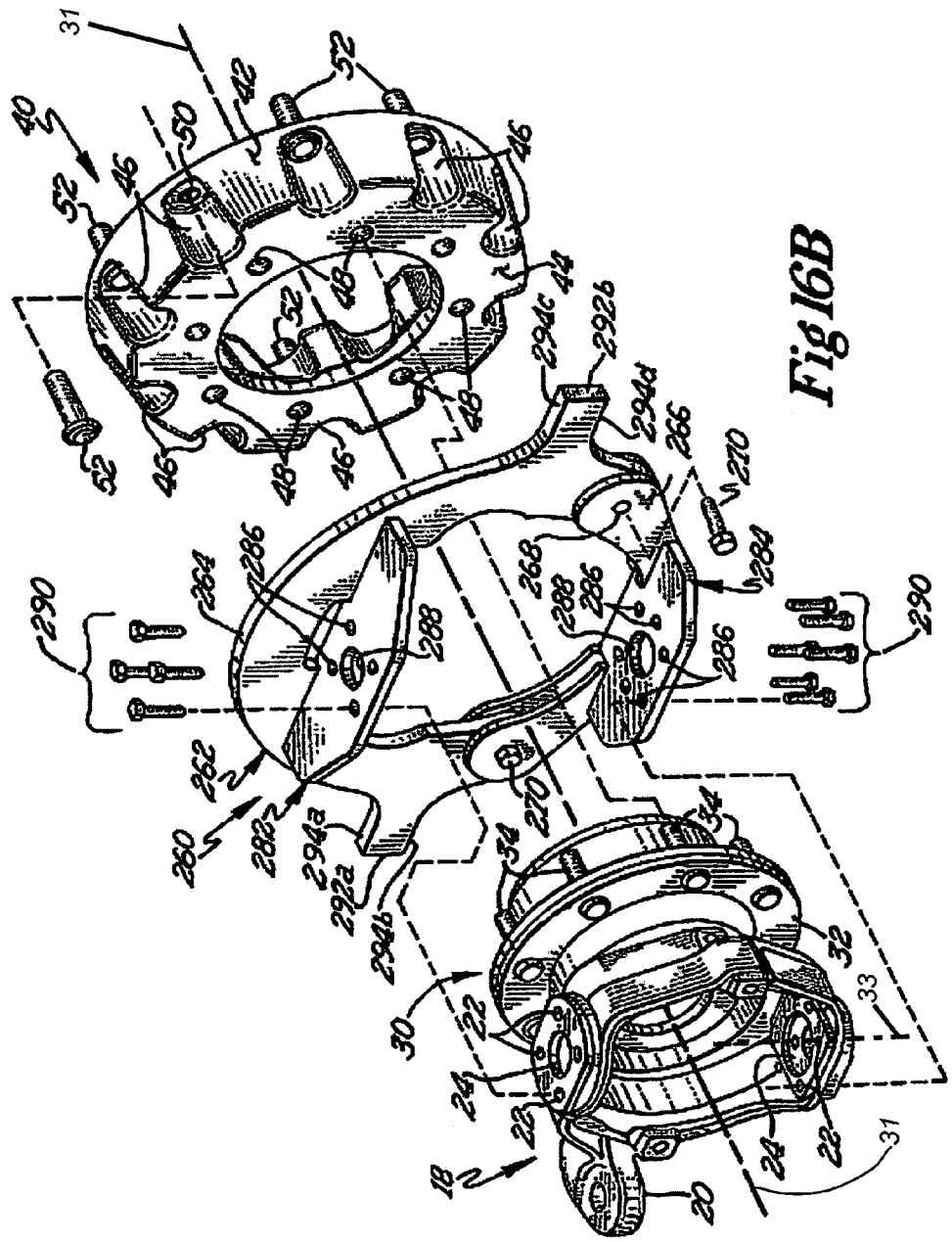
FIG. 16B is a partial, exploded, perspective view of the partial vehicle hub housing, the limiting apparatus and the spacing element of FIG. 16A.

Now also referring to FIGS. 3-4, the typical vehicle 4 with which the track system(s) 14 may be used will generally include a drive axle 16 that terminates with a hub 30 (i.e., an axle hub) with a flange 32 and bolts 34 to which a wheel 6 is normally attached and secured thereto with existing fastening elements such as bolts 34 and nuts 36. The hub 30 is rotated about a drive axis 31 by the axle 16. Sometimes, when the wheels 6 are steerable, the hub 30 is pivotally mounted to the axle 16 by way of a housing 18 (i.e., a swivel housing, a steering housing, an axle housing, etc.). As will be understood, the housing 18, which is pivotally mounted to the axle 16 along a generally vertical axis (i.e., a steering axis 33), may be rotated by way of a steering arm 26 that is operatively connected to a steering knuckle 20. As illustrated in FIG. 4, the knuckle 20 of a generic steering system extends outwardly and rearwardly from the housing 18 and is connected to the steering arm 26 such that the housing 18 and its attached wheel 6 or in the case of the present invention, its attached track system 14, can swivel about the vertical axis and steer the vehicle 12 in a normal fashion. See also, FIG. 16B.

Referring now also to FIGS. 5-6, once the respective wheel 6 of the vehicle has been removed, a track system 14 of the present invention may be connected to the axle 16. The track system 14 may be connected directly to the wheel hub 30 by the bolts and nuts 34, 36 which are attached to the drive sprocket 102 of the track system when it is attached to a rigid axle 16. However, as in the case of a steerable hub 18, the track system 14 may be positioned too close to the body of the vehicle and restrict the extent to which the track may be steered. In such a situation, the track system 14 may include a spacing element 40 that is interposed between the wheel hub of the vehicle and the track system, and which positions the track system 14 away from the vehicle 12 such that the normal steering range is effectively maintained. Generally, the spacing element will be able to connect the existing wheel hub of a vehicle with a drive sprocket of a track system. To that end, the spacing element will include a first set of apertures that correspond to the apertures of the wheel hub of the vehicle, and a second set of apertures that correspond to apertures of the drive sprocket of a track system. As will be understood, the first and second sets of apertures may differ in terms of numbers and patterns, depending upon the particular vehicle to which a track system is to be attached. A preferred spacing element 40 includes a generally cylindrical or conically shaped body 42 having two ends 43A, 43B, with the first end 43A having an inwardly extending flange 44 and the second end 43B having an inwardly extending flange 45. The first end flange 44 includes a plurality of apertures 48 that correspond to the bolt holes of the wheel hub 30, and are designed to receive bolts 34 and to be secured thereto by nuts 36 when the spacing element 40 is attached to a wheel hub 30. The second end flange 45 includes a plurality of apertures 50 that are designed to receive bolts 52 that extend through apertures in a drive sprocket 214 and to be secured thereto by nuts 54 when a track system is attached to the spacing element. In this way, the drive sprocket 102 is rotated about the drive axis 31 by the hub 30 through the spacing element 40. The body 42 of the spacing element 40 includes outer and inner recesses or channels 46, 47, which extend from ends 43A, 43B to apertures 50, 48, in flanges 45, 44, respectively. Preferably, the channels or recesses 46, 47 have curved walls and allow access to respective apertures. This results in the first end flange 44 having a somewhat scalloped outer periphery and the second end flange 45 having a somewhat scalloped inner periphery. As will be appreciated, the recesses or channels add strength to the body, which is important as the longitudinal length of the body increases. In addition, it will also be appreciated that the recesses or channels and serve to reduce its overall weight of the spacing element. It will be understood that the shape and configuration of the spacing element may varied without departing from the spirit and scope of the invention. For example, the body of the spacing be foreshortened so that it the shape of the spacing element is more in the nature of a plate or disc.

Now also referring to FIGS. 7-14B, a preferred track system 14 of the present invention generally includes a frame 60 having first and second ends 61A, 61B. More specifically, the frame 60 includes a first plate 62 and a second plate 64 that are generally parallel to each other and are connected to each other by a plurality of struts 66. Each plate 62, 64 includes an inner surface 68, 69 and an outer surface 70, 71, respectively. The first and second plates 62, 64 also include an aperture 108, 110 that is sized and configured to receive a tensioning mechanism 170. Generally, the frame 60 includes an endless track drive sprocket 102, a first (or forwardmost) roller 82, a second (or rearwardmost) roller 84, and a plurality of intermediate rollers 86. The sprocket 102, which comprises first and hemispherical second sections 104, 106, with each section having outwardly extending teeth and an inwardly extending flange with apertures, is operatively connected with fastening elements to the flange of a main hub 134 (i.e., a track hub), which is attached, by conventional fastening elements, to a top wall 152 of an enclosure 150 that is attached to the outer surface of the second plate 64. Each of the first and second rollers 82, 84 are operatively connected by way of transverse shafts 88 to pair of shoes 90, 92, that are received in C-shaped rails 112. Each shoe 90, 92 is generally rectangular in shape and includes a transverse shaft bearing element 94, a first or top wall 98, a second or bottom wall 99 and an end wall 96. In addition, each shoe includes a pair of flanges 95 that extend away from each other in opposite directions along the top and bottom walls. Each rail 112 includes a top wall 114, a side wall 116 and a bottom wall 118, which form a C-shaped channel 120 that is configured and arranged to slidingly receive a respective shoe. Note that the flanges 95 of each shoe will lie adjacent the edges of the top and bottom walls of the rail when the shoe is positioned therein. Preferably, the rails are located adjacent the first and second ends 61A, 61B of the frame 60 so that when the first and second rollers 82, 84 are connected to the frame, they are able to partially extend therebeyond and so that they are also able to partially extend below the lower extent of the frame 60.

The track system 14 preferably further includes a plurality of smaller intermediate rollers 86 (or bogey wheels) that are located in between the first and second rollers 82, 84 and which are rotatably mounted to shafts 89 that are attached to flanges 132 that extend inwardly towards each other from the inner surfaces 68, 69 of plates 62, 64, and which are proximate the lower edges of apertures 108, 110, respectively. The intermediate rollers 86 are configured to rotatably ride on edge surfaces of parallel guide bars 80 that extend from an inner surface 78 of the endless track 76. Preferably, the intermediate rollers 86 have a thinned center portion that is arranged and configured such that the intermediate rollers 86 provide clearance for the sprocket 102 as it rotates. The inner plate 62 of the frame 60 also has an upwardly extending, u-shaped recess 111 sized to provide clearance for the spacing element 40 so that it may freely rotate during normal operation. The track system 14 of the preferred embodiment includes a segmented endless track 76 that may be drivingly engaged by the sprocket 102. However, as will be appreciated, the track systems of the present invention may be used with non-segmented endless tracks known in the art.

Tension for the endless track is maintained by dual tensioning mechanisms that are operatively connected between first roller and the frame of the track assembly. Generally, each respective tensioning mechanism includes a cylindrically shaped force exerting member having first and second ends, and each tensioning mechanism is operatively connected to the a first roller so that is able to urge the roller in a forward direction, relative to the frame. Having dual tensioning mechanisms that are operatively connected to the first roller is necessary in order to avoid interference with the sprocket rotation and to maintain the overall compact nature of the track assembly. In addition, the dual tensioning mechanisms are interconnected with each other so that they are able to provide equal amounts of force to the ends of the support shaft on which the first roller is rotatably mounted. As will be appreciated, the combined forces of the first and second tensioning mechanisms will have the effect of a single, much larger tensioning mechanism. Each of the tensioning mechanisms has a force exerting member such as a grease cylinder (for example, a grease cylinder from Aurelius Mfg. Co., Inc., Braham, Minn.), hydraulic cylinder or the like to resist movement of the first roller in the direction towards the second roller in response to impacts with generally immovable objects such as curbs. In preferred embodiments, the tensioning members of the track system are fluidly connected to each other by a conduit, which serves to equalize the force applied to each end of the support shaft and the respective roller associated therewith. The tensioning mechanisms of the present invention are discussed in more detail below.

The frame 60 of the present invention further preferably includes a reinforcing enclosure 150 affixed to the outer surface 70. The preferred enclosure 150 of this embodiment is box-like and includes a top wall 152, bottom wall 154, first wall 156, second wall 158 and a panel 160, which are connected to each other and the outer plate so as to form a unitary structure. The enclosure 150 of the present invention directly supports and strengthens the second plate 64, and indirectly strengthens the first plate 62, by virtue of interconnecting struts 66. This enables the frame 60 to better resist flexing due to torsional forces. As will be understood, the outer tensioning mechanism 170 of the shown track system 14 is not easily accessible through the enclosure 150. However, the tensioning mechanisms 170 may be accessed from the inner side of the track system 14 by removing the spacing element 40, if present, and then removing the sprocket 102. Preferably, the sprocket 102 of the present invention is a split sprocket and includes first and second pieces or sections 104, 106. By carefully positioning of the sprocket 102, only one of the pieces 104, 106 need be removed in order to inspect, maintain or replace the tensioning mechanism 170.

The frame 60 of the present invention also draws additional reinforcement from a plurality of parallel struts 66 that are spaced apart from each other and which extend between the first plate 62 and the second plate 64. Preferably, the struts 66 are cylindrical and have hollow interiors 124 such that the weight of the frame 60 is reduced. One of the struts 66 may serve to house the conduit 180 that fluidly connects the first tensioning mechanism to the second tensioning mechanism.

For track systems 14 having endless steel tracks 76, the first roller 82 is operatively connected to the frame 60 with a pair of shoes 90, 92 that are configured to slide longitudinally (towards the second roller) within corresponding rails 112 connected to the inner surfaces 68 of the first and second plates 62, 64. The shoes 90, 92 include a first wall 98, a second wall 99, and bearings 94 that are operatively connected to the ends of a transverse shaft 88 about which the first roller 82 is rotatably mounted. The rails 112 of the present invention preferably include a top wall 114, side wall 116 and bottom wall 118 that define a C-shaped channel 120. The shoes 90 of the first roller 82 can slide within their respective channels 120 to absorb shocks that come from encountering immovable objects, as discussed above. The shoes 92 of the second roller 84 are generally immovably retained within their respective channels 120. In order to position the second roller 84 a desired distance from the frame 60, a spacer 100 may be positioned between an end wall 96 of each shoe 92 and a bracket 126, two of which are attached to respective plates 62, 64 of the frame 60. Each bracket includes an opening 128 through which a portion of the tensioning mechanism, including an interconnecting conduit 180, may extend. Note that each bracket 126 is also operatively connected to one of the tensioning mechanisms 170 that absorb impacts received by the first roller 82.

Generally, each tensioning mechanism 170 used with track systems 14 having endless, segmented, steel tracks, includes a cylindrically shaped force exerting member 172 having first and second ends, a force restoring element 174, and a block 176, and each tensioning mechanism is operatively connected to the a first roller so that is able to urge the roller in a forward direction. Preferably, each block 176 is attached to a respective end 96 of a shoe 90 by fastening elements 178 so that the first roller 82 is able to be linearly displaced along the C-shaped rails. The restoring element 174 bears special mention. During forward movement of the vehicle 12, should the track assembly 14 contact an obstruction such as a curb (not shown) the first or forwardmost roller 82 is forced rearwardly against the resiliency of not only the tensioning mechanisms 170, but also the restoring element 174. After the object has been traversed, expansion of the compressed restoring element 174 assists the tensioning mechanisms 170 in restoring the first or forwardmost roller 82 to its original operating position. The bracket 126, against which the tensioning mechanism 170 is in contact, has an opening 128 that is circumscribed by a circular guide 130, which form a cup-like structure that receives one end of the tensioning mechanism 170, the resilient restoring element 174, and a portion of the interconnecting conduit 180. The tensioning mechanism 170 of the embodiment including an endless track 76 made of steel has a preferred length in the range of about 12.25 to about 16.25 inches (30.0-40.0 cm), more preferably about 14.25 inches (36.0 cm).

Figure 20:
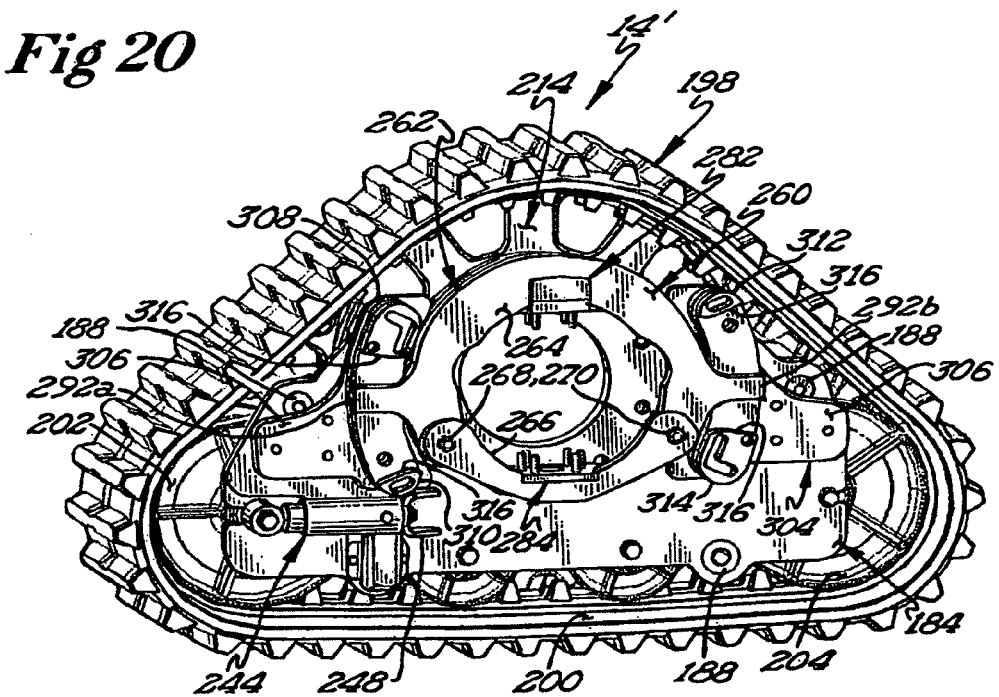
FIG. 20 is an inboard plan view of yet another track system of the present invention having a limiting apparatus, the limiting apparatus shown in a neutral position.
Figure 21:
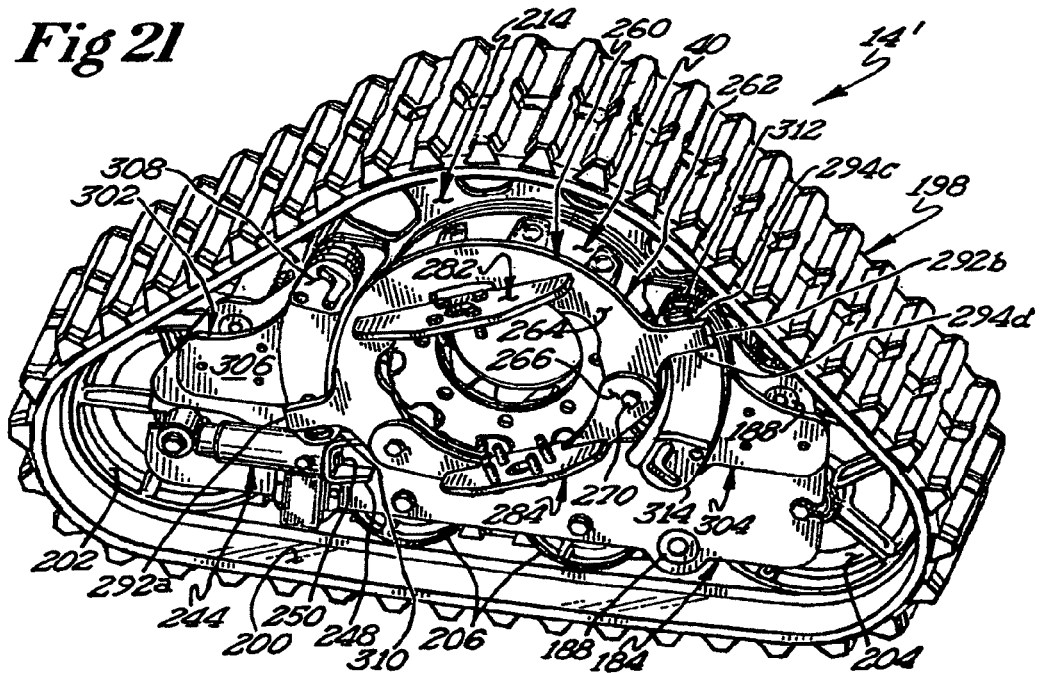
FIG. 21 is a perspective inner view of the track system of FIG. 20 illustrating the cooperative engagement between the two components of the limiting apparatus.
Figure 22:
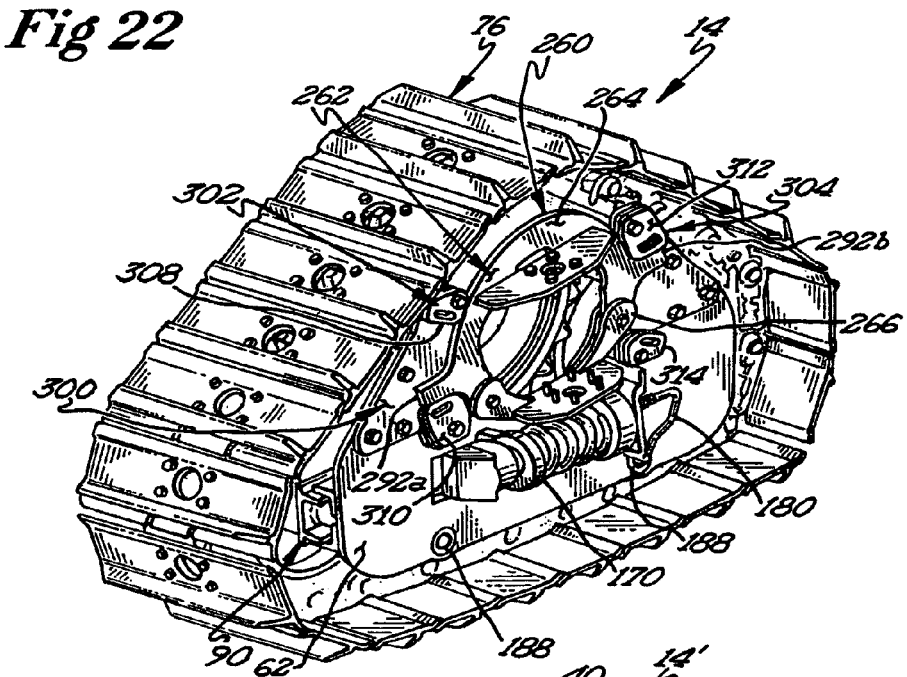
FIG. 22 is a perspective inboard view of the track system of FIG. 8 including a limiting apparatus.
Figure 23:
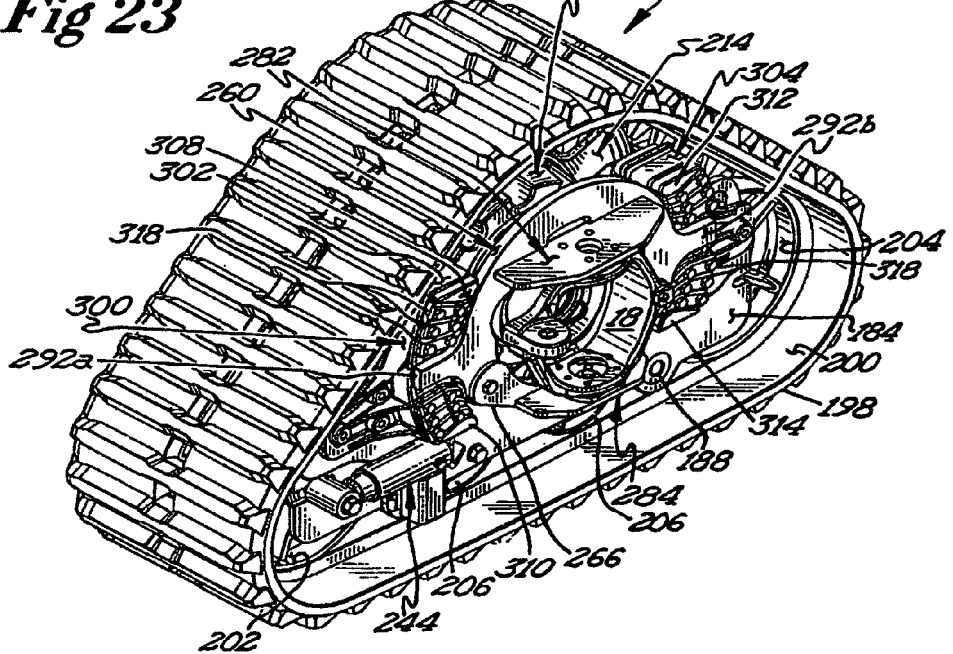
FIG. 23 is a perspective inboard view of the track system of FIG. 15 illustrating an alternative limiting apparatus.
Figure 24A:
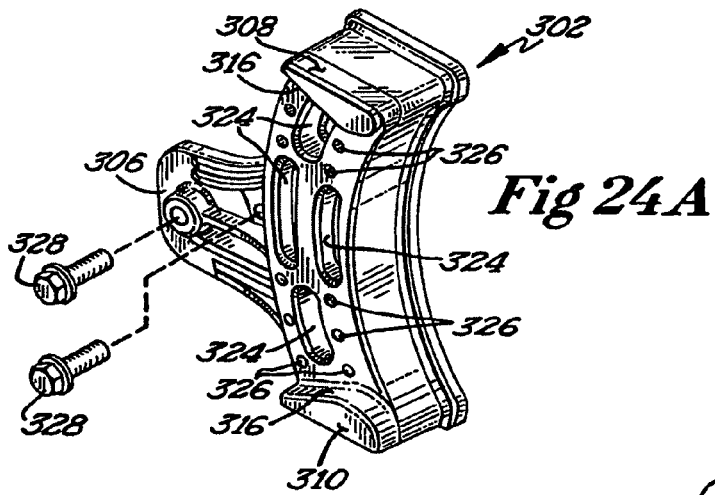
FIG. 24A is a partially exploded, perspective view of a first member of the limiting apparatus.
Figure 24B:
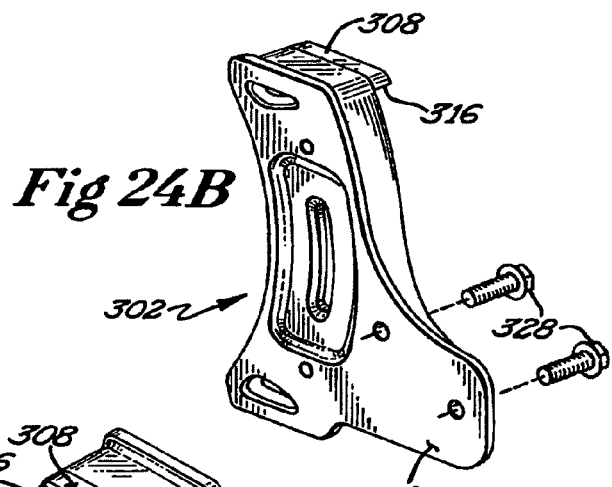
FIG. 24B is a partially exploded, perspective rear view of the first member of FIG. 24A.
Figure 24C:
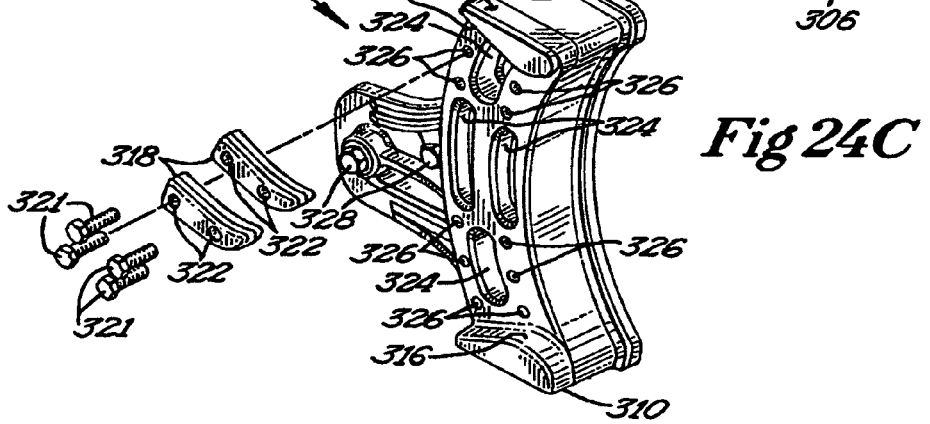
FIG. 24C is a partially exploded, perspective view of the first member of FIG. 24A including attachable shims.

For track systems 14' having endless rubber 198 or elastomeric tracks, the preferred frame 182 is best illustrated in FIGS. 16A, 17, 18, and 19A-D. It will be noted that with this embodiment, the first and second rollers 202, 204 (FIG. 17) are not interconnected to the frame 182 with shoes. Instead, the preferred frame 182 for use with endless rubber tracks 198 includes a pair of open ended longitudinal slots 221 on each of the first and second ends 194, 196 of the frame 182. The tensioning mechanisms 244 include two ends, with one end of each tensioning mechanism 244 operatively connected to opposite ends of the shaft bearing 212 to which the first roller 202 is rotatably mounted, and the other ends of the tensioning mechanisms 244 operatively connected to the frame 182 by way of brackets 248 (FIGS. 16A and 19A-D) and fastening elements 250 (FIGS. 20, 21). In operation, the tensioning mechanisms 244 allow the ends of the shaft 210 of the first roller 202 to shift position within the slots 221 as the front of the track assembly 14' encounters and reacts to generally immovable objects. In preferred embodiments, as also described above, the tensioning mechanisms 244 are fluidly connected with a conduit 252. Additionally, as with the previously described embodiment, once the object has been traversed, force exerting members 246 restore the first roller 202 to its original operating position. As will be appreciated, the tensioning mechanisms 244 for track systems 14' having endless elastomeric tracks 198 do not necessarily require the use of a restoring element; it is optional. And, similar to the previously described embodiment, the second roller 204 is generally immovable, with the ends of its support shaft 210 being removably retained in the longitudinal slots 221 of the second end of the frame 196.

Figure 17:
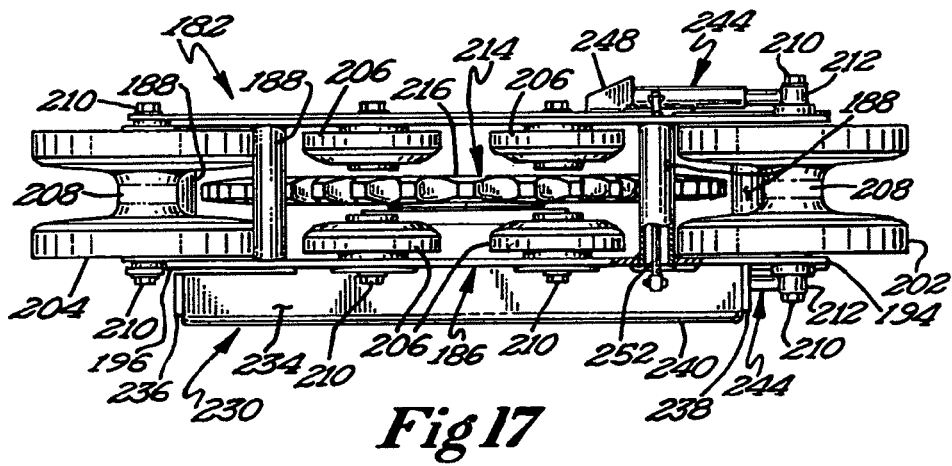
FIG. 17 is a bottom plan view of the track system of FIGS. 3-4.

Referring now in particular to FIG. 17, it is noted that the first and second rollers 202, 204 of this embodiment include a centrally located groove or channel 208 that is sufficiently large enough to provide clearance for portions of the sprocket 214 so that it may freely rotate without interfering with the rollers 202, 204. Intermediate or bogey wheel rollers 206 are split apart, with two rollers attached to either side of the frame 182. It will be appreciated that this arrangement allows the track assembly 14' to be configured into a compact form that is lighter and more easily manipulated than conventional track assemblies. While such rollers 202, 204 may be unitary in construction, it is envisioned that the each roller may comprise two separate rollers that are configured to form a groove or channel 208 therebetween.

The frame 182 of the present invention further preferably includes a reinforcing enclosure 230 affixed to the outer plate 186. The preferred enclosure 182 of this embodiment is box-like and includes a top wall 232, bottom wall 234, first wall 236, second wall 238 and a panel 240, which are connected to each other and the outer plate 186 so as to form a unitary structure. The enclosure 230 of the present invention directly supports and strengthens the outer plate 186, and indirectly strengthens the inner plate 184, by virtue of interconnecting struts 188. This enables the frame 182 to better resist flexing due to torsional forces. As will be understood, the outer tensioning mechanism 244 of the shown track system 14' is not easily accessible through the enclosure 230. However, the tensioning mechanisms 244 may be accessed from the inner plate 184 of the track system 14' by removing the spacing element 40, if present, and then removing the sprocket 214. Preferably, the sprocket 214 of the present invention is a split sprocket and includes first and hemispherical second sections 216, 217, with each section having outwardly extending teeth and an inwardly extending flange with apertures for attachment to the flange of a main hub 224 (i.e., a track hub). By carefully positioning of the sprocket 214, only one of the pieces 216, 217 need be removed in order to inspect, maintain or replace the tensioning mechanism 244. In addition, the inner plate 219 of the frame 182 also has a u-shaped recess 218 sized to provide clearance for the spacing element 40 so that it may freely rotate during normal operation.

For embodiments of the present invention including rubber or rubber-like tracks 198, in addition to the enclosure 230 or instead of the enclosure, the frame 182 may be reinforced by affixing an additional plate 219 to one or more surfaces 190, 192 of the first or second plates 184, 186.

A preferred track system 14' of the present invention for vehicles 12 having steerable axles 16 may include a limiting apparatus 260 to restrict the range of rotational motion of the frame 182 with respect to the axle 16. A preferred limiting apparatus 260 of the present invention is best illustrated in FIGS. 16B and 24A-C. Generally, the limiting apparatus 260 comprises a collar 262 that is associated with the vehicle 12 to which the track assembly 14' is being attached, and a limiting assembly 300 that is associated with the track assembly 14' itself. More specifically, the collar 262 includes first and second sections 264, 266 that are configured to be positioned about the exterior surface of an axle housing, and which are removably connected to each other with fastening elements 270 inserted through apertures 268 in each of the respective sections. Preferably, each section 262, 264 includes an outwardly extending flange or bracket 282, 284, with each bracket including a plurality of peripheral apertures 286 and a center aperture 288. In use, the respective brackets 282, 284 of the collar 262 are positioned over upper and lower surfaces of the swivel housing 18 at the end of the axle 16 such that the center and attachment apertures 288, 286 are aligned with corresponding apertures 22, 24 in the housing 18. Then, the collar 262 is secured to the housing 18 with fastening elements 290 such as bolts. During operation of the tracked vehicle 12, the collar 262 will remain attached to the housing 18 and will be able to rotate about a vertical axis as the tracked vehicle 12 is steered normally. However, the collar 262 will not rotate with respect to the rotational axis 31 of the wheel axle. The frame 182 of the track assembly 14, which is operatively connected to the wheel hub 30, will be able to rotate about the wheel hub axis 31 of the track assembly 14 as the grade of the ground "g" changes and as the tracked vehicle 12 encounters obstacles (not shown) on the ground "g". In preferred embodiments, the collar 262 includes at least one stop, preferably a first stop 292a and a second stop 292b. As depicted, the stops 292a, 292b extend outwardly from the collar 262 in a radial direction, however it is understood that they may extend in other directions without departing from the spirit and scope of the invention. Each stop 292a, 292b preferably includes two contact surfaces 294a-b, 294c-d, wherein the contact surfaces are configured to simultaneously engage components of the limiting assembly 300, discussed below. The stops 292a, 292b are positioned on opposite sides of a vertical reference plane RP that passes through the drive axis 31.

Figure 16D:
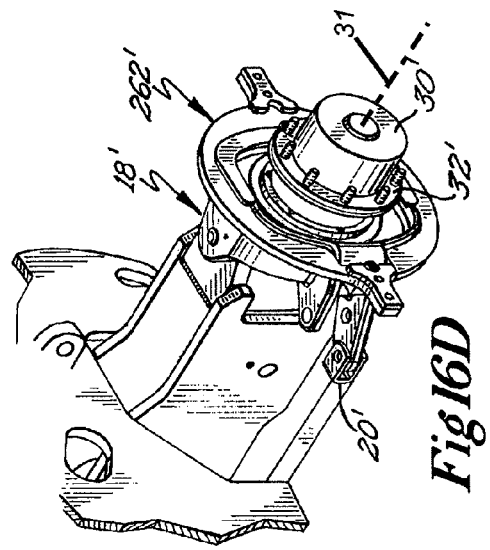
FIG. 16D is a perspective view of the alternate collar of FIG. 16C attached to the bell housing of the vehicle.
Figure 16F:
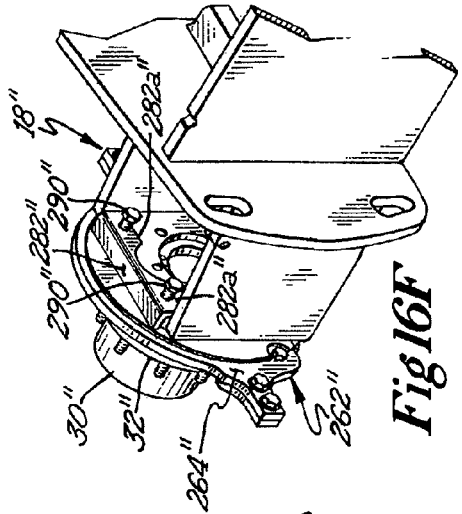
FIG. 16F is a perspective view of the alternate collar of FIG. 16E attached to the drive wheel housing of the vehicle.
Figure 16C:
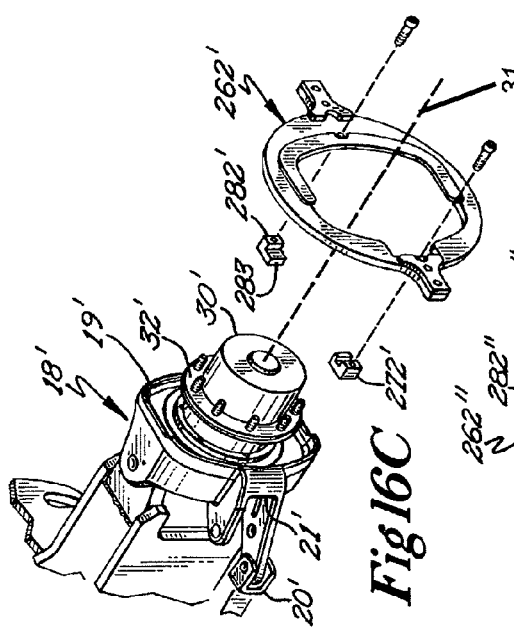
FIG. 16C is an exploded, perspective view of an alternate collar of the present invention, prior to attachment to a bell housing of a vehicle.
Figure 16E:
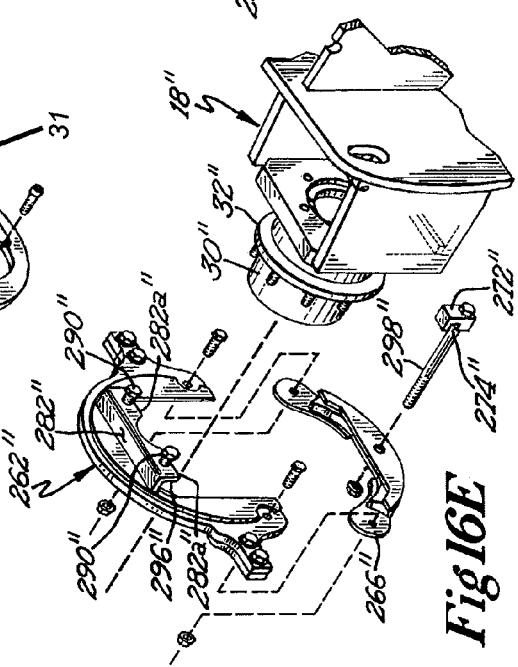
FIG. 16E is an exploded, perspective view of the an alternative collar of the present invention, prior to attachment to a drive wheel housing of a vehicle.
Figure 19B:
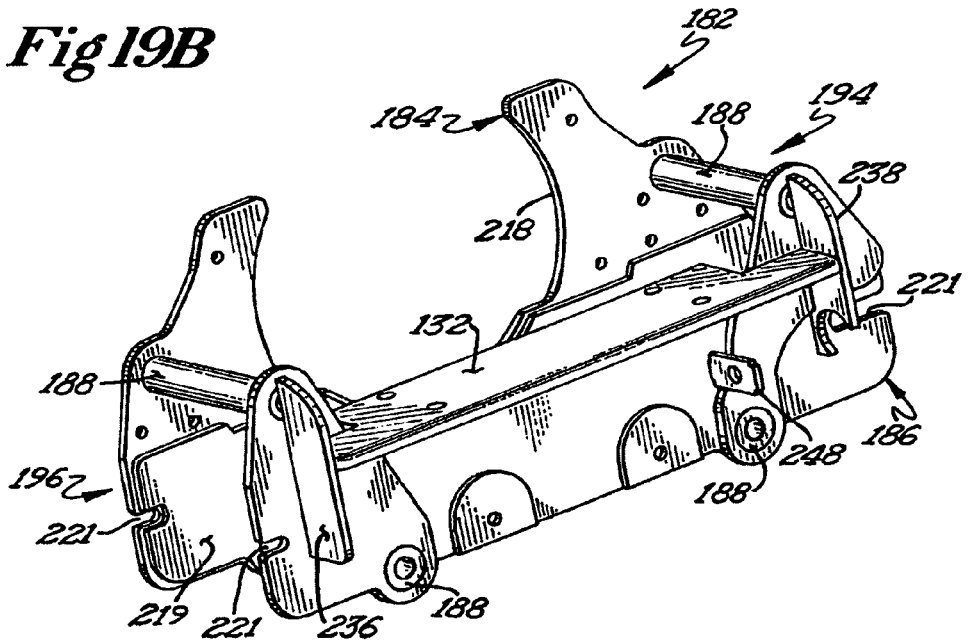
FIG. 19B is a perspective view of the inboard side of the frame of the track system of FIG. 15.
Figure 19C:
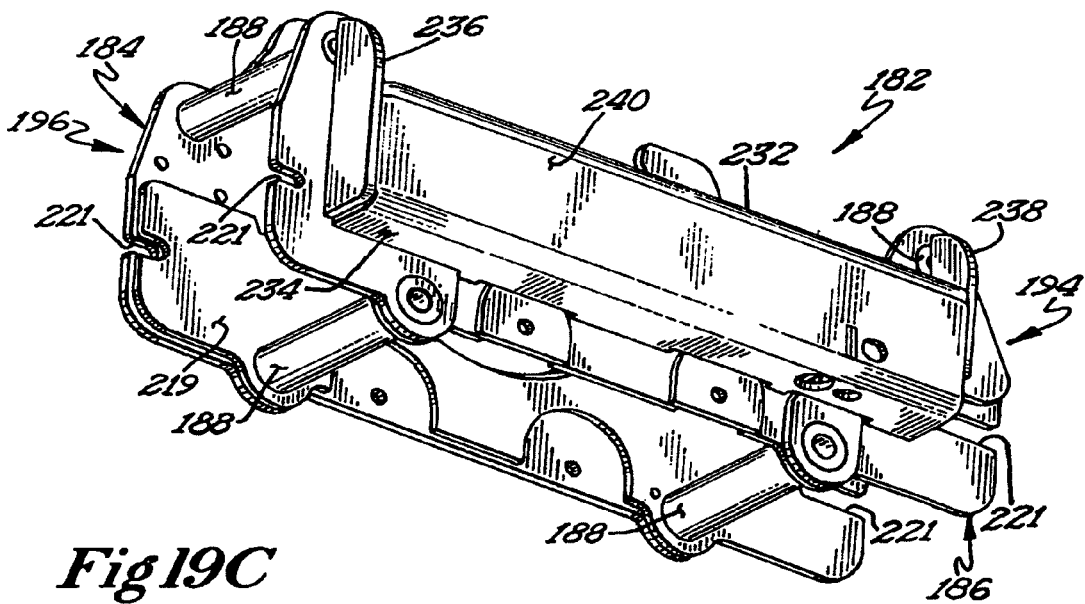
FIG. 19C is a perspective view of the outboard side of the frame of the track system of FIG. 15, taken from below the frame.
Figure 19D:
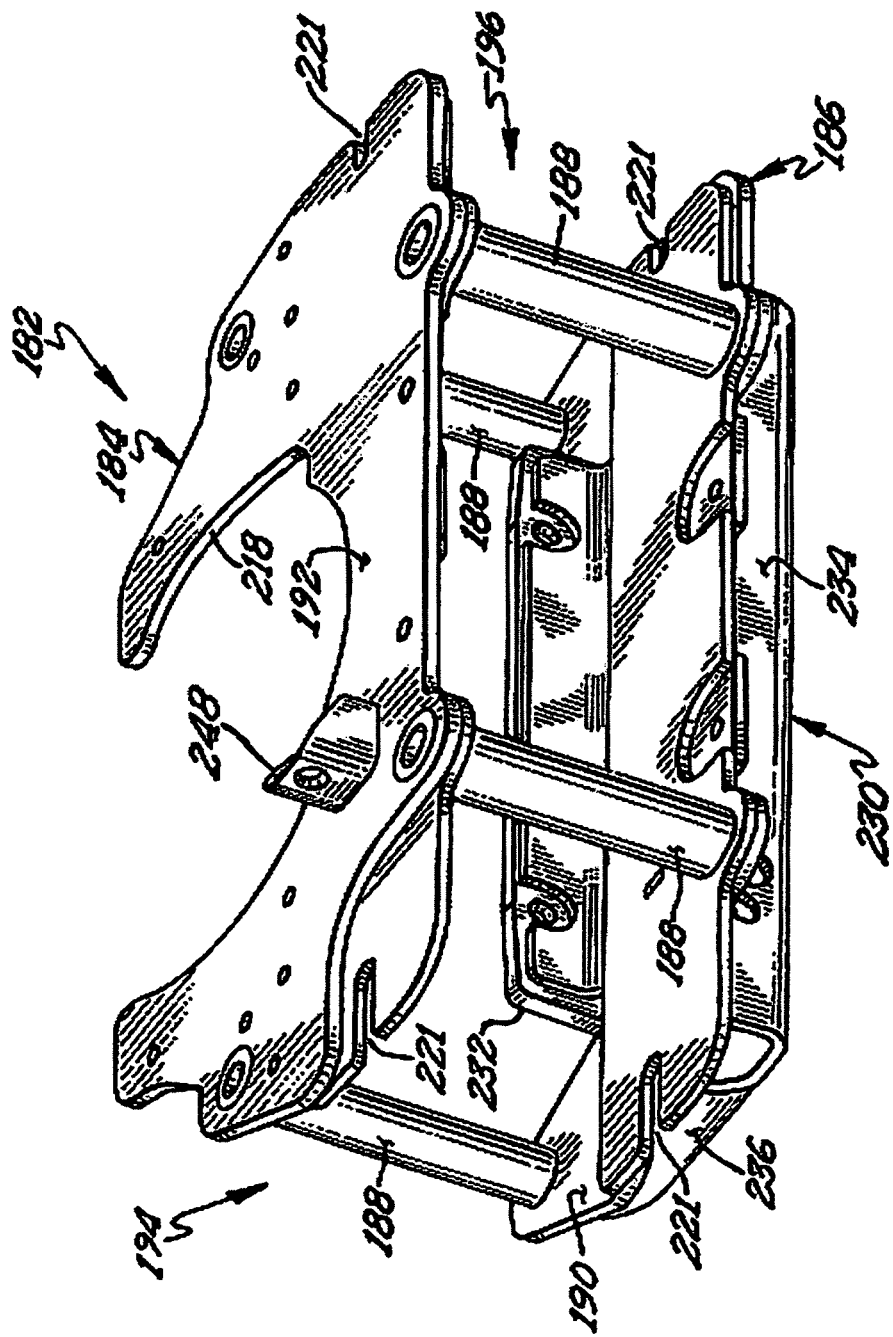
FIG. 19D is a bottom perspective view of the inboard side of the frame of the track system of FIG. 15.

In situations where an axle housing 18" adjacent a wheel hub 30" does not include upper and lower surfaces with corresponding attachment apertures, the brackets of collar may be modified so that they are able to engage raised portions of the housing to which it is attached. In a preferred embodiment, FIGS. 16E-F, a collar 262" may be provided with a first bracket 282" that includes one or more downwardly extending flanges 282a" that form a channel(s) 296" between a surface of the first section 264" and the flange 282a". Bolts 290" may be provided for the flange(s) 282a" so that a portion of the axle housing 18" will be able to be frictionally retained within the channel 296". The second bracket of the second section 266" may be replaced with an elongated, outwardly extending bolt 298" that is connected to a clamp block 272" having an inwardly extending channel 274". The inwardly extending channel 274" of the clamp block 272" is configured and arranged so that it may engage a second raised section of a housing 18' to which it is attached. Preferably, when the bolt 298" is tightened, the clamp block 272" is drawn up against the second raised portion of the housing 18" and the collar 262" is secured thereto. In operation, rotation of the collar 272" is primarily resisted by the housing 18", about which the collar 262" is nestably positioned, and to a lesser extent, the attachment bracket 282" and clamp block 272". Alternatively, as depicted in FIGS. 16C-D, a collar 262' may be provided with a bracket 282' and clamp 272' that are used to connect the collar 262' to a portion of a steering knuckle 20' and flange 19' of a bell housing 18' that supports wheel hub 30'. More specifically, the bracket 282' includes a flange 283' that forms a channel with a surface of the collar 262' when the bracket 282' is drawn up against the collar 262'. Clamp 272' includes an inwardly facing channel that is configured to engage a portion of a transverse wall 21' of the steering knuckle 20'. As with the previous embodiment, the rotation of the collar 262' is primarily resisted by the housing 18' itself, about which it is nestably positioned. It will be appreciated that, in accordance with the present invention, the collars of the present invention can be customized for various bell housings.

Generally, the limiting assembly 300 has a first member 302 and a second member 304, with each member 302, 304 having at least one flange 306 with which to attach the respective members 302, 304 to the second plate 186 of the frame 182 with bolts 328. The components of the limiting assembly 300 that contact the stops 292a, 292b of the collar 262 comprise at least two posts 308, 310, 312, 314, respectively, that are configured to abuttingly engage one or more stops of a collar when the frame 182 has reached a maximum predetermined rotational angle. Preferably, each member 302, 304 includes two spaced apart posts 308, 310, 312, 314 with the posts arranged radially about the rotational axis of the wheel hub 30 so that when the track assembly 14' rotates in either direction, the stops of the collar 292a-b engage two of the (diametrically opposed) posts 308, 310, 312, 314 simultaneously and act in concert to prevent over-rotation of the track assembly 14'. In preferred embodiments, the first and second members 302, 304 may include one or more channels 324 to reduce the overall weight of the respective members.

In a preferred embodiment, the limiting apparatus 260 is adjustable such that the range of rotational motion that the frame 14' can move with respect to the axle 16 may be varied. In this embodiment, either the posts 308, 310, 312, 314 may be removably secured such that they may be repositioned on a respective member 302, 304 or the limiting assembly 300 may be provided with removable shims 318 positioned proximate either side of the posts 308, 310, 312, 314 of each member 302, 304. In preferred embodiments, the stops 292a, 292b reside between the shims 318, or the posts 308, 310, 312, 314 in embodiments not including shims. Shims 318 of the preferred embodiment are generally wedge shaped, having contact surfaces 320, and which may be secured to the first and second members 302, 304 with at least one removable fastening element 321, such as a bolt, inserted through at least one aperture 322 in each shim 318 that corresponds to an aperture 326 in the respective member 302, 304.

As will be appreciated, the removal or addition of shims 318 allows the range of rotational motion in which the frame 14' can move relative to the axle 16 to be increased or decreased. It is preferable that the shims 318 or posts 308, 310, 312, 314 be contoured to correspond to the shape of the contact surfaces 316 of the posts and stops such that when respective shim or posts impact the stops of the collar 262, force is dissipated throughout larger surface areas. Even more preferably, the shims 318 are contoured such that they not only correspond to the collar stops 292a, 292b but also to the other shims such that the shims 318 may be connected to the members 302, 304 in a juxtaposed relation as shown in FIGS. 23 and 24A-C. Moreover, the preferred shims 318 all have substantially the same configuration so that they may be interchangeably positioned on either of the two members 302, 304. In preferred embodiments, the shims 318 have a radial range from about 1 to about 6 degrees. As an alternative to having a limiting assembly with configurable or positionable posts, it is envisioned that the stops of a collar may be modified to achieve the same result. That is, the contact surfaces of the stops may be effectively widened or narrowed, as desired.

Figure 25A:
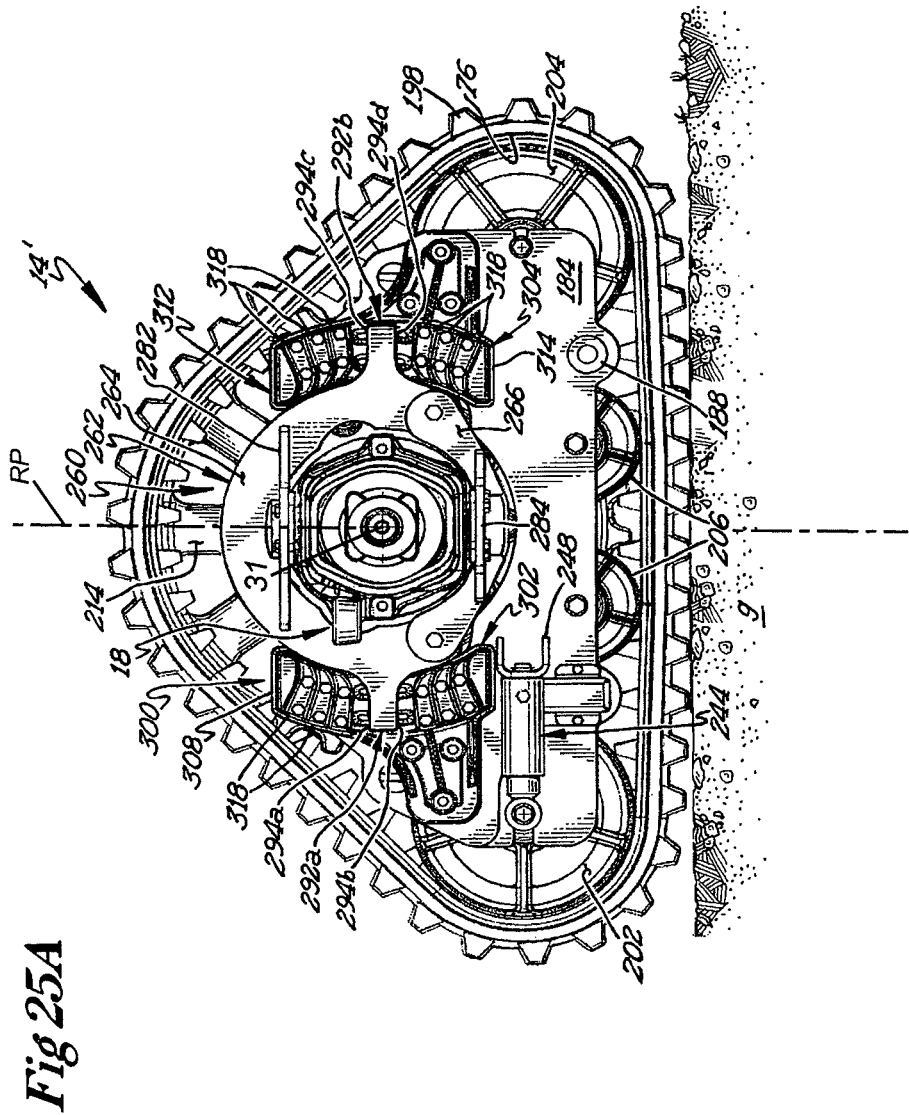
FIG. 25A is an inboard, elevational plan view of a track assembly in a neutral position.

For example, FIGS. 25A-25C illustrate how the limiting apparatus 260 restricts movement of the track assembly 14' relative to the axle 16 of a vehicle 12 that is traversing uneven or undulating ground "g". FIG. 25A shows an inboard view of a track assembly 14' and a limiting apparatus 260, with the collar 262 attached to exterior of an axle housing, and with the limiting assembly 300 attached to frame 182. In this depiction, the track assembly 14' is in a generally horizontal position, wherein the stops of the collar are positioned between shims 318. Note that rotational movement available to the track assembly 14' is approximately the same in the clockwise and counterclockwise directions. As best depicted in FIG. 25B, the range of rotational motion "r" is defined by the distances between each post 308, 310, 312, 314 and the contact surfaces 294a-d of the stops 292a, 292b (or defined by the distances between shims and the contact surfaces of the stops, as the case may be), may rotate without contacting a stops 292a, 292b. Thus, if a user wanted to increase the range of rotation for a track assembly represented by "r1", one would remove an appropriate number of shims, and the increased range would be expanded to the representation "r2" in FIG. 25B. In FIG. 25B the track assembly 14' is depicted as pitching forward and in FIG. 25C the track assembly 14' is depicted a rearing backward. When the frame 14' has reached the predetermined maximum degrees of rotational movement "r2" with respect to the axle 16, the posts or shims 308, 310, 312, 314, 318 are blocked by the diametrically opposed stops 292a, 292b such that the frame 14' is prevented from moving any further in that direction.

Figure 26:
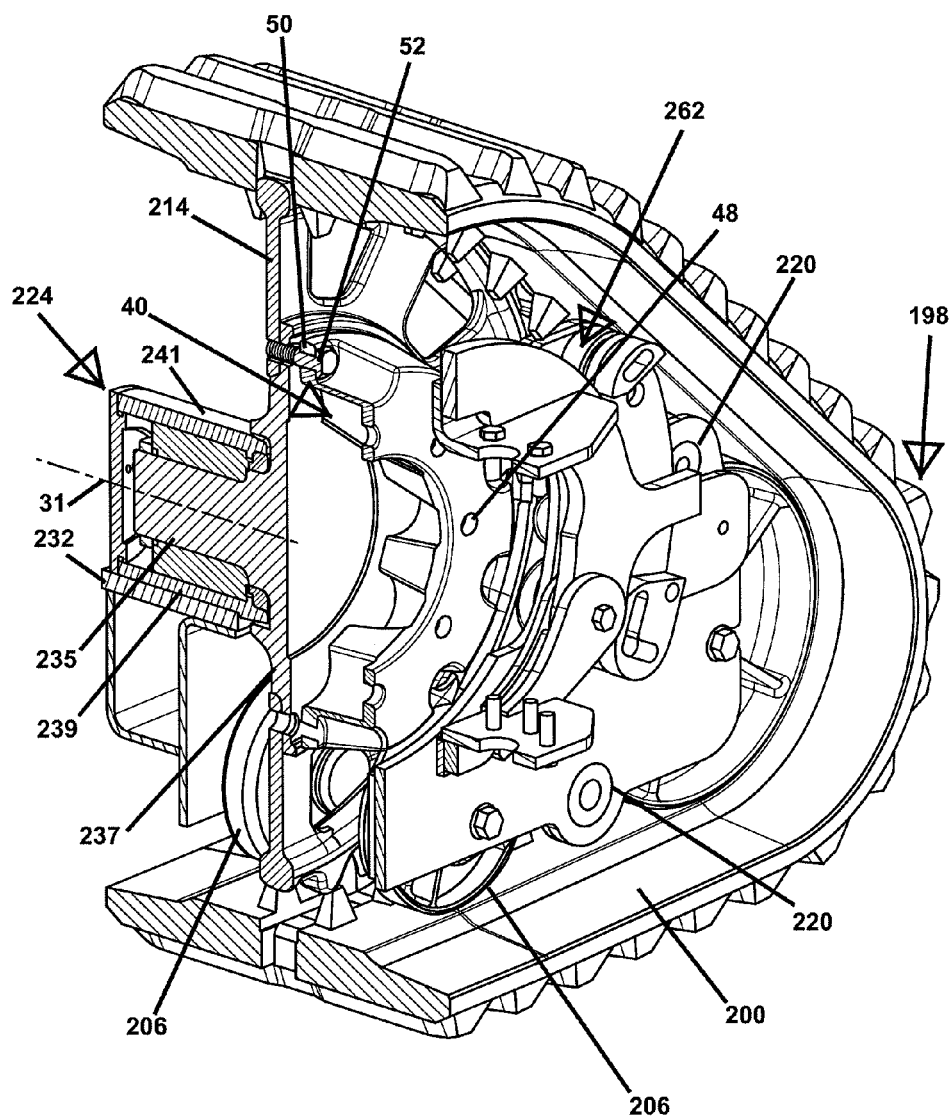
FIG. 26 is a cross-sectional view of the track system of FIG. 15.

Referring to FIGS. 26 and 27, the track hub 224 includes a hub shaft 235 that rotates with a hub flange 237 (i.e., a sprocket flange). The hub shaft 235 is supported by a bearing 239 mounted within a hub housing 241 fastened to the top wall 232 of the reinforcing enclosure 230. The spacer 40 and the sprocket 214 are attached to the hub flange 237 by fasteners 52 that extend through openings 50 of the spacer 40. The spacer 40 is attached to the drive hub 30 by fasteners 34 (see FIG. 16B) received in openings 48 defined by the spacer 40.

The track hub 224 allows the drive sprocket 214 to be rotated relative to the frame 182 about the drive axis 31. The sprocket 214 is rotated about the drive axis 31 by torque from the axle hub 30 that is transferred from the axle hub 30 to the drive sprocket 214 through the spacer 40. The track hub 224 also allows the frame 182 to pivot about the drive axis 31 as shown at FIGS. 25B and 25C.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A track system comprising:
    a frame having a first end and a second end, the frame having inboard and outboard frame assemblies that extend between the first and second ends of the frame;
    a drive sprocket mounted between the inboard and outboard frame assemblies such that the inboard frame assembly is inboard of the drive sprocket and the outboard frame assembly is outboard of the drive sprocket, the drive sprocket being rotatable relative to the frame about an axis of rotation;
    a first end roller mounted at the first end of the frame;
    a second end roller mounted at the second end of the frame;
    a track routed in a generally triangular path about the drive sprocket and the first and second end rollers, the track being driven by the drive sprocket about the generally triangular path when the drive sprocket is rotated about the axis of rotation; and
    inboard and outboard cylinders for moving the first end roller relative to the frame to tighten the track, the inboard and outboard cylinders being in fluid communication with one another, the inboard cylinder being inboard of the drive sprocket and the outboard cylinder being outboard of the drive sprocket;
    wherein the generally triangular path of the track has an apex, and wherein the drive sprocket engages the track adjacent the apex to drive the track about the generally triangular path; and
    wherein the track defines a bottom side of the generally triangular path that extends between the first and second end rollers, wherein the track system includes first, second, third and fourth intermediate rollers for supporting the track along the bottom side of the generally triangular path, wherein the first, second, third and fourth intermediate rollers are positioned between the inboard and outboard frame assemblies, wherein the first, second, third and fourth intermediate rollers are respectively mounted on first, second, third and fourth cantilevered shafts, wherein the first and third cantilevered shafts are supported by the inboard frame assembly and the first and third intermediate rollers are respectively mounted on the first and third cantilevered shafts adjacent the inboard frame assembly, wherein the second and fourth cantilevered shafts are supported by the outboard frame assembly and the second and fourth intermediate rollers are respectively mounted on the second and fourth cantilevered shafts adjacent the outboard frame assembly, and wherein the drive sprocket passes between the first and second intermediate rollers and between the third and fourth intermediate rollers as the drive sprocket is rotated about the axis of rotation.

2. The track system of claim 1, wherein the first and second cantilevered shafts are co-axially aligned and the third and fourth cantilevered shafts are co-axially aligned.

3. The track system of claim 2, wherein the first and second end rollers are positioned between the inboard and outboard frame assemblies and are mounted on end roller shafts each supported by the inboard and outboard frame assemblies.

4. The track system of claim 3, wherein the first and second end rollers each include first and second flanges, and wherein the drive sprocket passes between the first and second flanges of the first and second end rollers as the drive sprocket is rotated about the axis of rotation.

5. The track system of claim 4, wherein the inboard and outboard frame assemblies are interconnected at a first interconnection location positioned above the first end roller, wherein the inboard and outboard frame assemblies are interconnected at a second interconnection location positioned above the second end roller, wherein the inboard and outboard frame assemblies are interconnected at a third interconnection location positioned between the first end roller and the first and second intermediate rollers, and wherein the inboard and outboard frame assemblies are interconnected at a fourth interconnection location positioned between the second end roller and the third and fourth intermediate rollers.

6. The track system of claim 5, wherein the first and second interconnection locations include struts that extend between the inboard and outboard frame assemblies.

7. The track system of claim 6, wherein a conduit for fluidly connecting the first and second cylinders passes through the strut of the first interconnection location.

* * * * *